(12) United States Patent
Irisawa et al.

(10) Patent No.: US 7,618,554 B2
(45) Date of Patent: Nov. 17, 2009

(54) LIQUID CRYSTAL COMPOSITION

(75) Inventors: Masatomi Irisawa, Saitama (JP); Takahiro Otsuka, Saitama (JP); Hirokatsu Shinano, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 11/792,256

(22) PCT Filed: Nov. 8, 2005

(86) PCT No.: PCT/JP2005/020415

§ 371 (c)(1),
(2), (4) Date: Jun. 4, 2007

(87) PCT Pub. No.: WO2006/061966

PCT Pub. Date: Jun. 15, 2006

(65) Prior Publication Data

US 2008/0149890 A1    Jun. 26, 2008

(30) Foreign Application Priority Data

Dec. 10, 2004 (JP) .............................. 2004-358113

(51) Int. Cl.
C09K 19/30 (2006.01)
C09K 19/12 (2006.01)
C09K 19/20 (2006.01)

(52) U.S. Cl. .................. 252/299.63; 252/299.61; 252/299.62; 252/299.66; 252/299.67

(58) Field of Classification Search ............ 252/299.01, 252/299.61, 299.63, 299.66, 299.67, 299.62
See application file for complete search history.

(56) References Cited

U.S. PATENT DOCUMENTS

| | | | | |
|---|---|---|---|---|
| 5,403,512 | A * | 4/1995 | Bartmann et al. | 252/299.01 |
| 5,679,285 | A * | 10/1997 | Bartmann et al. | 252/299.63 |
| 6,159,393 | A * | 12/2000 | Tarumi et al. | 252/299.63 |
| 6,929,832 | B2 * | 8/2005 | Heckmeier et al. | 428/1.1 |
| 7,001,647 | B2 * | 2/2006 | Shinano et al. | 428/1.1 |
| 2004/0245501 | A1 * | 12/2004 | Heckmeier et al. | 252/299.63 |
| 2005/0161637 | A1 * | 7/2005 | Shinano et al. | 252/299.01 |

FOREIGN PATENT DOCUMENTS

| | | |
|---|---|---|
| DE | 19528085 | 2/1996 |
| DE | 19940655 | 4/2000 |
| JP | 56-91277 | 7/1981 |
| JP | 5-505247 | 8/1993 |
| JP | 6-160878 | 7/1994 |
| JP | 7-216356 | 8/1995 |
| JP | 7-225388 | 8/1995 |
| JP | 7-258141 | 10/1995 |
| JP | 7-306417 | 11/1995 |
| JP | 10-504032 | 4/1998 |
| JP | 10-245559 | 9/1998 |
| JP | 11-29771 | 2/1999 |
| JP | 2003-301178 | 10/2003 |
| JP | 2005-015775 | * 1/2005 |
| WO | 2004/053582 | 6/2004 |
| WO | WO 2004/058676 | 7/2004 |

OTHER PUBLICATIONS

English translation by computer for JP 2005015775, http://www4.ipdl.inpit.go.jp/Tokujitu/PAJdetail.ipdl?N0000=60&N0120=01&N2001=2&N3001=2005-015775.*
Chinese Patent Office issued a Chinese Office Action dated Jun. 29, 2009, Application No. 2005/800394977.

* cited by examiner

*Primary Examiner*—Shean C Wu
(74) *Attorney, Agent, or Firm*—Young & Thompson

(57) ABSTRACT

Disclosed is a liquid crystal composition characterized by containing 15% by mass or more of a compound having a terminal structure represented by the general formula (I) below. This liquid crystal composition has high dielectric constant anisotropy ($\epsilon$) and low rotational viscosity ($\gamma 1$), and is thus suitably used as a liquid crystal composition for IPS liquid crystal displays or low voltage-driven TN liquid crystal displays. (I) (In the above formula, Q represents a saturated or unsaturated alkyl group having 1-8 carbon atoms which may be substituted by a halogen atom.)

3 Claims, No Drawings

LIQUID CRYSTAL COMPOSITION

TECHNICAL FIELD

The present invention relates to a liquid crystal composition and particularly to a liquid crystal composition that has a high dielectric anisotropy ($\Delta\varepsilon$) and a low rotational viscosity ($\gamma_1$) and is thus suitable for IPS liquid crystal displays or low voltage-driven TN liquid crystal displays.

BACKGROUND ART

There have been manufactured a large number of liquid crystal display elements utilizing optical (refractive index) anisotropy ($\Delta n$) and dielectric anisotropy ($\Delta\varepsilon$) characteristic of liquid crystal compounds. The liquid crystal display elements have been widely applied to clocks, calculators, various measuring instruments, automotive panels, word processors, electronic notebooks, portable phones, printers, computers, TV sets, and the like, with demand increasing year by year. A liquid crystal compound exhibits a characteristic liquid crystal phase between a solid phase and a liquid phase. The liquid crystal phase is roughly classified into nematic phase, smectic phase, and cholesteric phase, of which nematic phase is currently most widely used for display elements. Regarding to techniques applied to liquid crystal displays, as a display mode, there have been a large number of proposals, and currently known modes include, for example, dynamic scattering (DS), guest-host (GH), twist nematic (TN), super twist nematic (STN), thin film transistor (TFT), ferroelectric liquid crystal (FLC), and the like, while as a driving system, there are known static driving, time-division driving, active matrix driving, dual-frequency driving, and the like.

In common liquid crystal displays such as TN and STN, which have been conventionally widely used, the electric field generated for reorientation is substantially perpendicular to the liquid crystal layer. In contrast, in in-plane switching (IPS) mode, the electric field has a significant component parallel to the liquid crystal layer.

In IPS liquid crystal displays, by applying the electric field generated using comb electrodes on one substrate, liquid crystal molecules constituting a liquid crystal layer oriented almost parallel to the substrate surface are rotated within a plane almost parallel to the substrate, and the display function is based on the birefringence of the liquid crystal layer. Such displays are proposed, for example, in Patent Documents 1 to 5 and others.

IPS displays have advantages such as a wider viewing angle and a lower load capacity as compared with conventional TN displays resulting from the in-plane switching of liquid crystal molecules, thereby extending the application to monitor, television sets, and the like having larger display area.

A liquid crystal composition used for IPS liquid crystal displays is required to have a low rotational viscosity ($\gamma_1$) enabling fast response. Moreover, it is effective to increase the electrode spacing in order to increase the numerical aperture for improving the brightness of displays, but in such case the threshold voltage due to the structure of IPS cells increases. To suppress this drawback, liquid crystal compositions having a high dielectric anisotropy ($\Delta\varepsilon$) are needed.

However, with conventionally known liquid crystal media, no liquid crystal composition with satisfactory performances has been yet attained.

For example, Patent Documents 6 and 7 and others propose a liquid crystal composition comprising a trifluorobenzene derivative for IPS liquid crystal devices; however, this liquid crystal composition is still unsatisfactory.

Patent Document 8 proposes an active matrix liquid crystal display using a liquid crystal whose specific resistance is not more than $1\times10^{14}$ O·cm and not less than $1\times10^{9}$ O·cm; however, the liquid crystal display is still unsatisfactory.

Further, it is expected that the market of liquid crystal display elements will develop in the field of portable information terminals such as portable phones, in which performances such as low power consumption are demanded. In this field, low voltage-driven TN liquid crystal displays are applied, and a liquid crystal composition used here is required to have a high dielectric anisotropy ($\Delta\varepsilon$) for decreasing the threshold voltage and a low rotational viscosity ($\gamma_1$) for increasing the response speed. Various liquid crystal compositions have been studied to meet such demands. No satisfactory composition, however, has been realized yet.

Patent Document 1: Japanese Patent Laid-Open Publication No. S56-91277
Patent Document 2: Japanese Patent Application Laid-Open No. H5-505247
Patent Document 3: Japanese Patent Laid-Open Publication No. H6-160878
Patent Document 4: Japanese Patent Laid-Open Publication No. H7-225388
Patent Document 5: Pamphlet of International Publication No. 2004/053582
Patent Document 6: Japanese Patent Laid-Open Publication No. H10-245559
Patent Document 7: Japanese Patent Laid-Open Publication No. H11-29771
Patent Document 8: Japanese Patent Laid-Open Publication No. H7-306417

DISCLOSURE OF THE INVENTION

Problems to be Solved by the Invention

Accordingly, an object of the present invention is to provide a liquid crystal composition that is useful for IPS liquid crystal displays and low voltage-driven TN liquid crystal displays and has a high dielectric anisotropy ($\Delta\varepsilon$) and a low rotational viscosity ($\gamma_1$).

Means to Solve the Problems

As a result of the earnest studies, the present inventors have found that the above object can be achieved with a liquid crystal composition obtained using a specific liquid crystal compound.

The present invention has been accomplished based on the above findings and provides a liquid crystal composition comprising 15% by mass or more of a compound having a terminal structure represented by general formula (I) below.

[Formula 1]

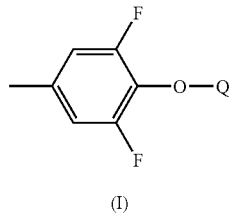

(I)

(In the formula, Q represents an optionally halogenated $C_{1-8}$ saturated or unsaturated alkyl group.)

BEST MODE FOR CARRYING OUT THE INVENTION

Hereinafter, the liquid crystal composition of the present invention will be detailed with the preferable embodiments.

The liquid crystal composition of the present invention comprises 15% by mass or more of a compound having a terminal structure represented by general formula (I). The use of 15% by mass or more of the compound provides a liquid crystal composition having a high dielectric anisotropy ($\Delta\epsilon$) and a low rotational viscosity ($\gamma_1$). The content of the compound is preferably 20% by mass or more, particularly preferably 25% by mass or more, and the upper limit is preferably 80% by mass.

In general formula (I), the optionally halogenated $C_{1-8}$ saturated or unsaturated alkyl group represented by Q includes, for example, methyl, ethyl, propyl, isopropyl, butyl, isobutyl, pentyl, hexyl, heptyl, octyl, isooctyl, 2-ethylhexyl, vinyl, allyl, monofluoromethyl, difluoromethyl, trifluoromethyl, 2,2,2-trifluoroethyl, 1,2,2-trifluoroethyl, 1,2,2-trifluorovinyl, perfluoroallyl, and the like.

Among the compounds containing a terminal structure represented by general formula (I), preferably used are compounds in which Q is perfluoroallyl, that is, compounds in which —O-Q in general formula (I) is represented by partial structural formula (II) below, because the resultant composition exists in nematic phase in a broad temperature range and has a low viscosity.

[Formula 2]

The compound having a terminal structure represented by general formula (I) includes, for example, the following compounds. In the following formulae $R^1$ and $R^2$ represent the same meanings as those in general formulae (III) and (IV) described later. Compounds shown in [Formula 3] to [Formula 7] and [Formula 11] to [Formula 15] are the compounds in which —O-Q in general formula (I) is represented by partial structural formula (II).

[Formula 3]

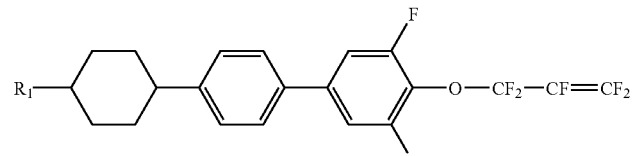

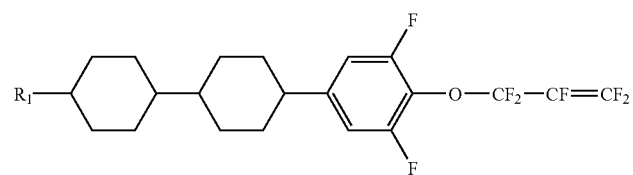

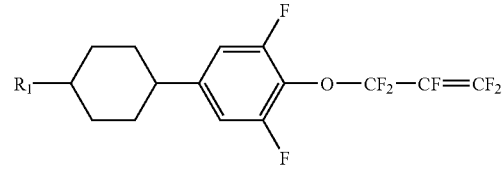

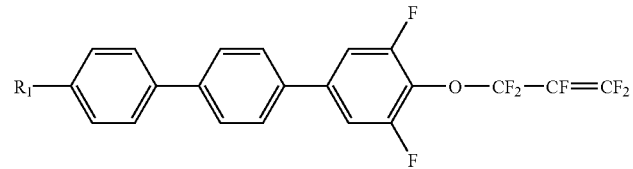

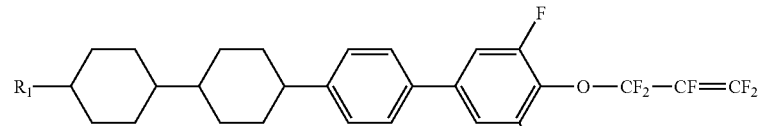

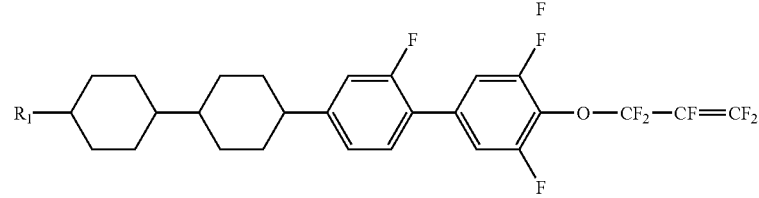

-continued
[Formula 4]
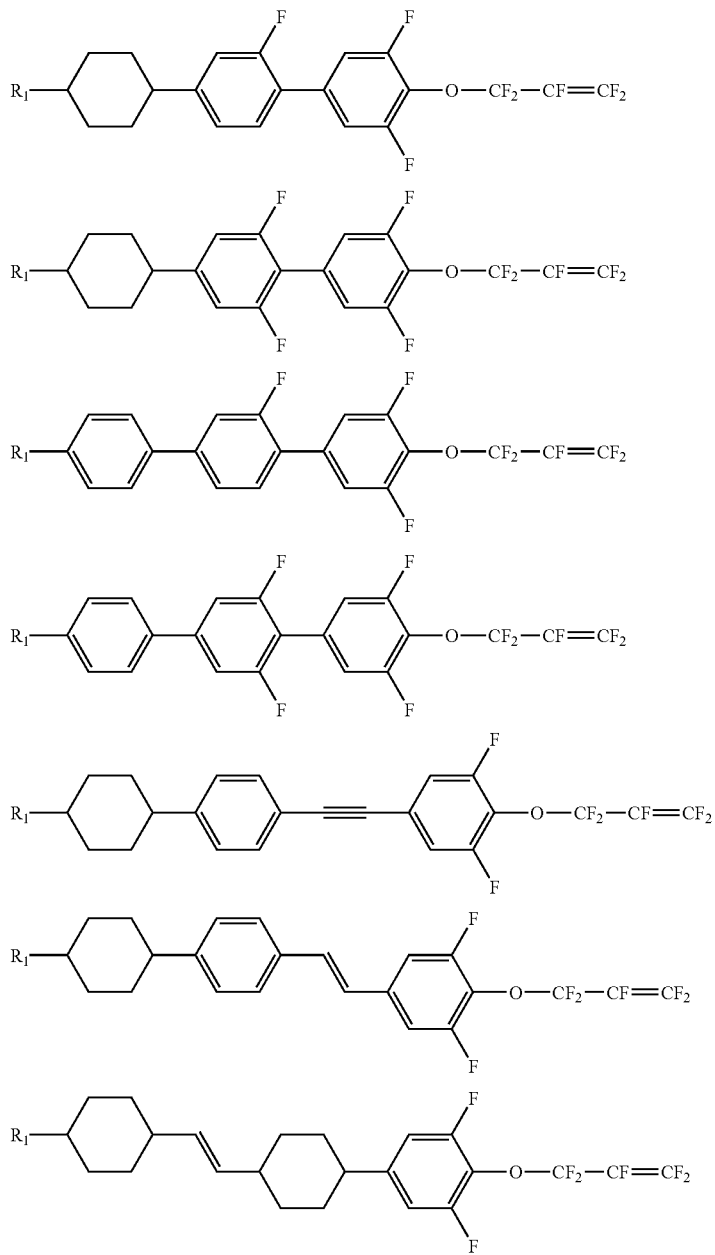
[Formula 5]
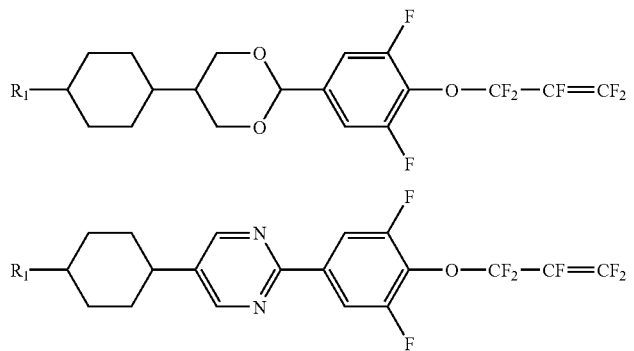

-continued
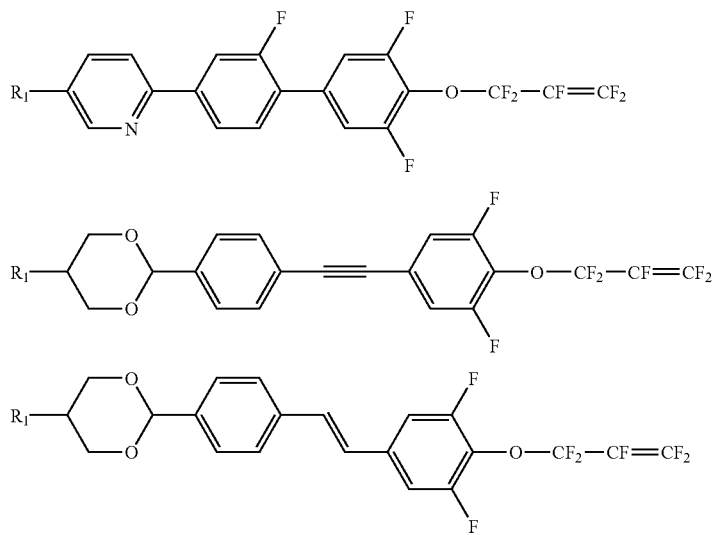
[Formula 6]
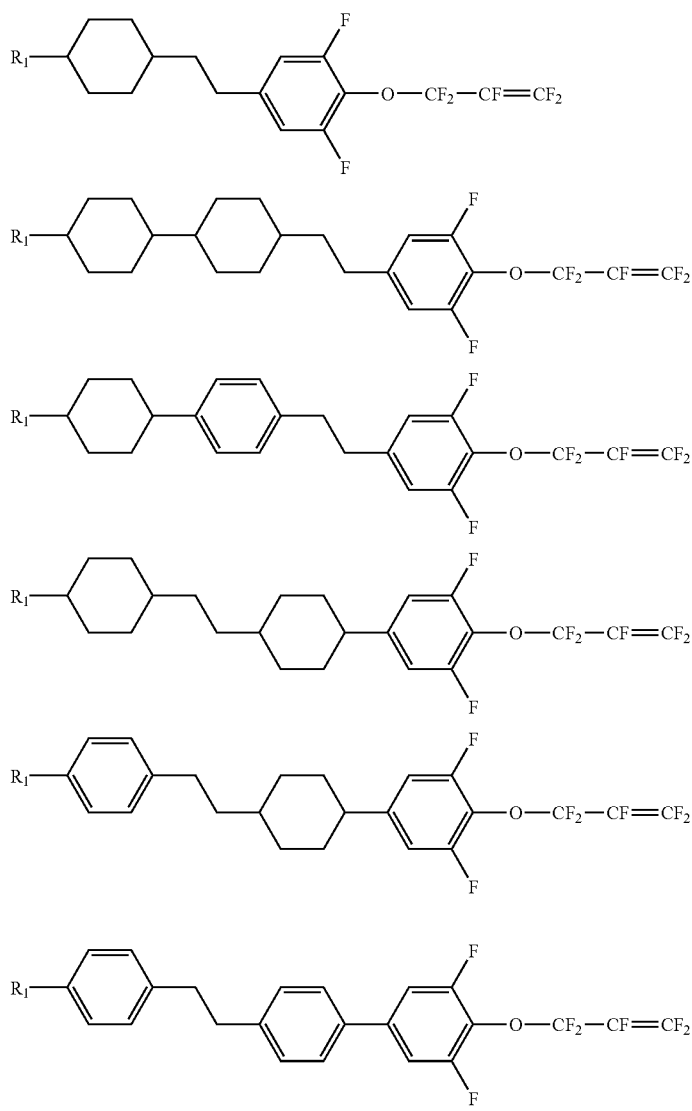

[Formula 7]
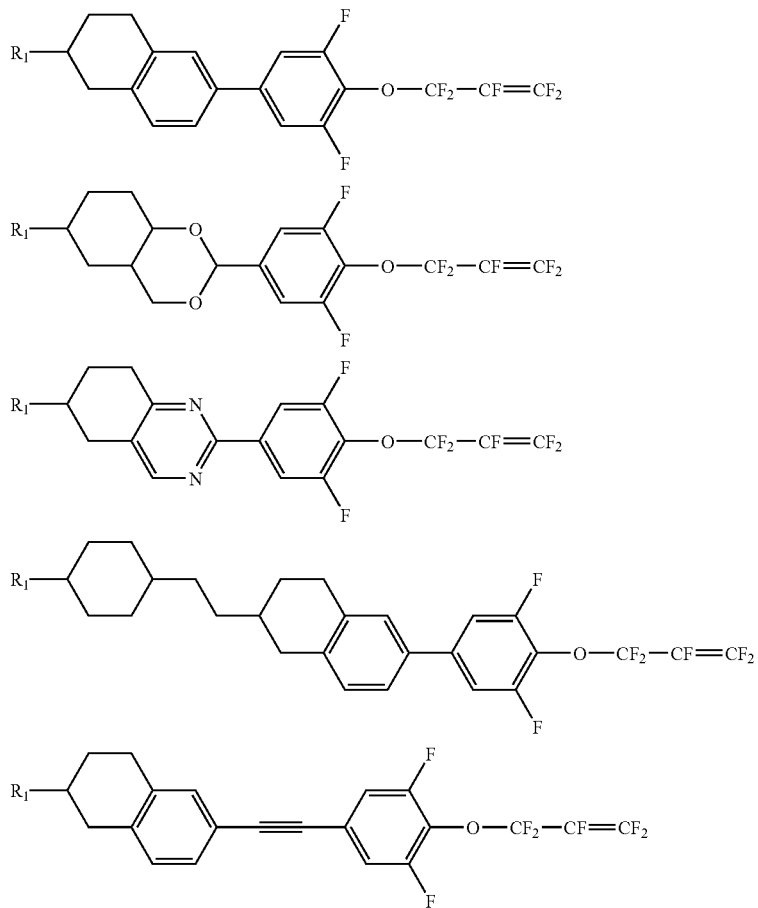
[Formula 8]
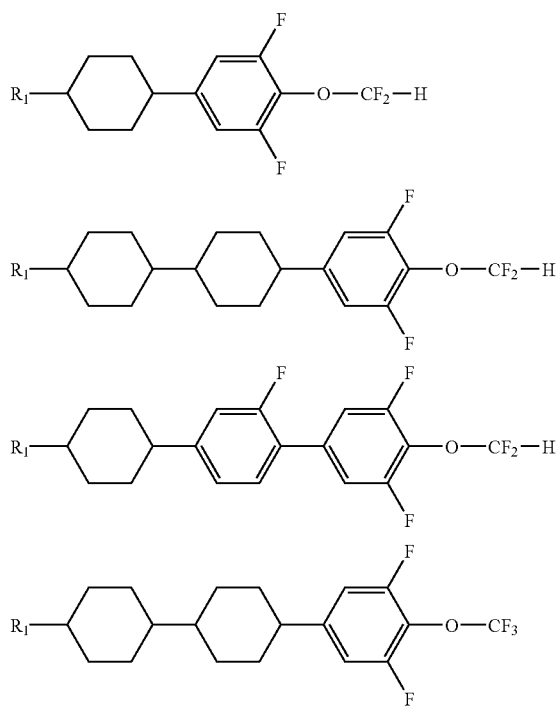

-continued
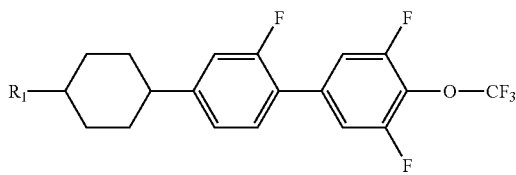
[Formula 9]
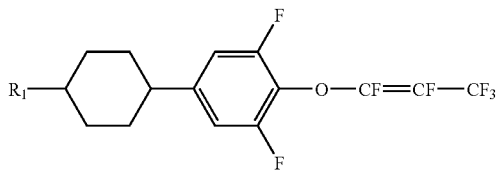
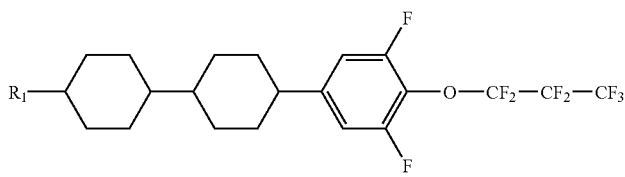
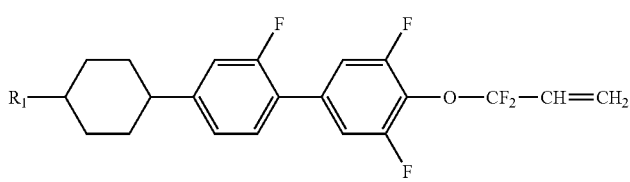
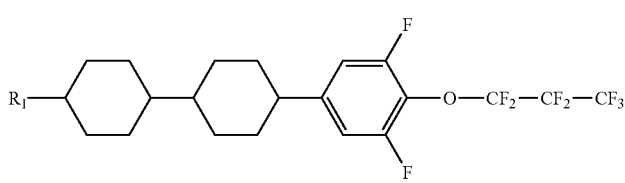
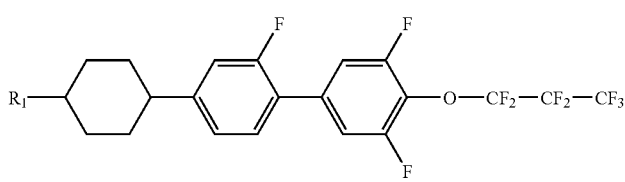
[Formula 10]
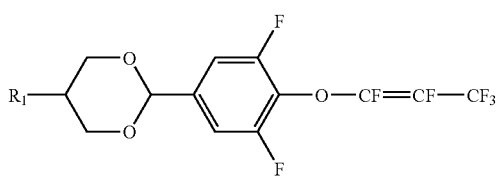
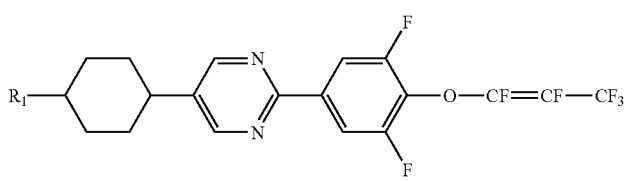
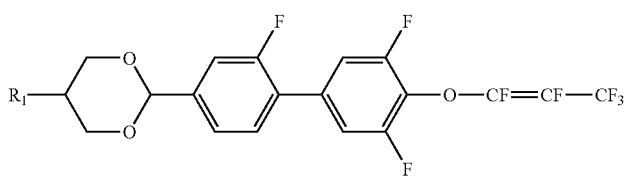

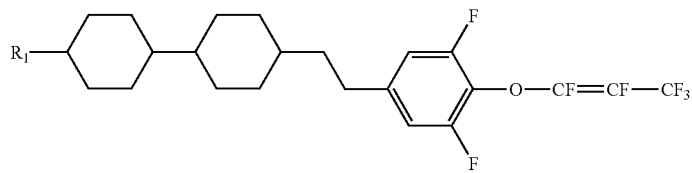
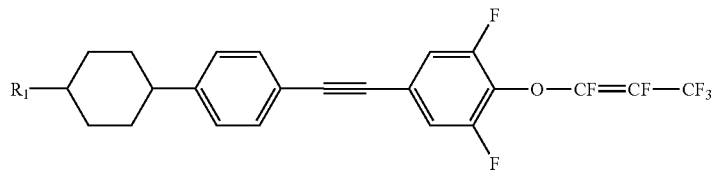
[Formula 11]
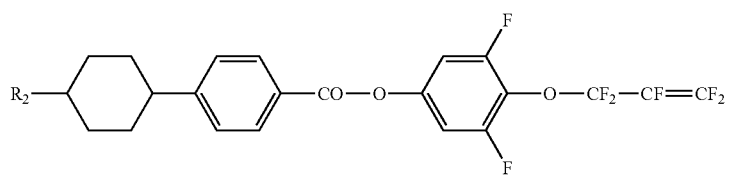
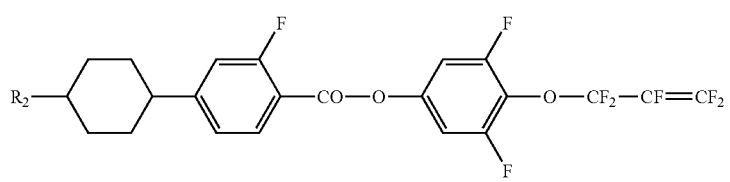
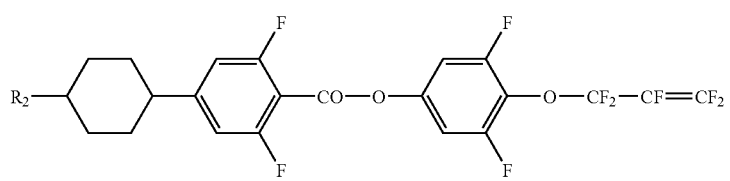
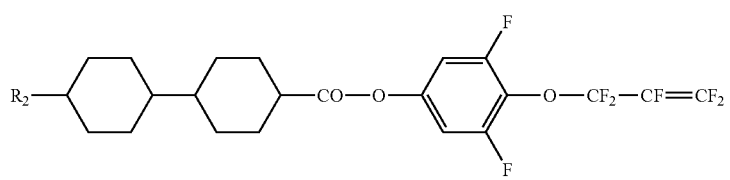
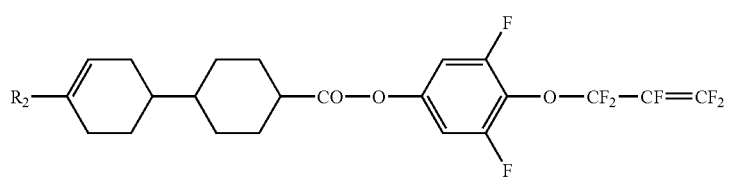
[Formula 12]
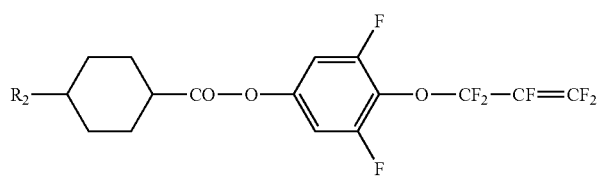
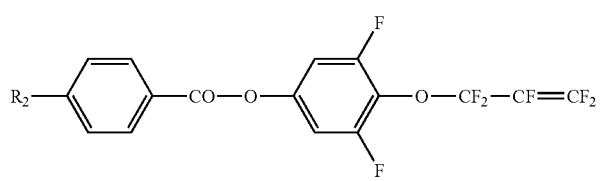

-continued
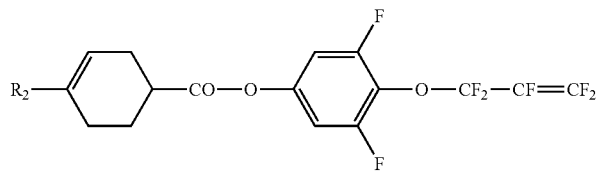
[Formula 13-1]
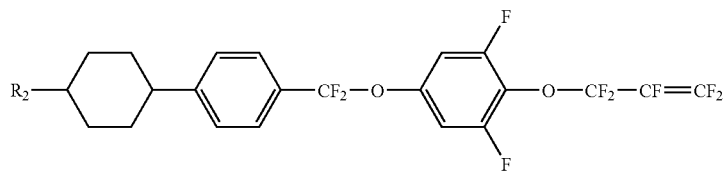
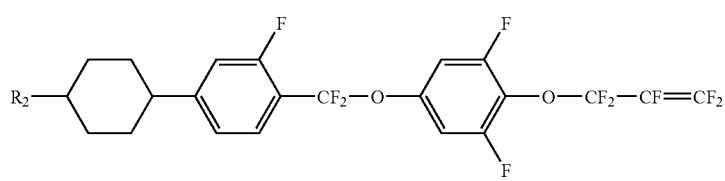
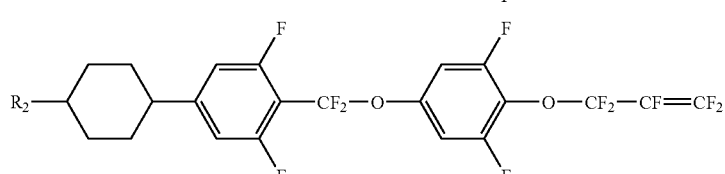
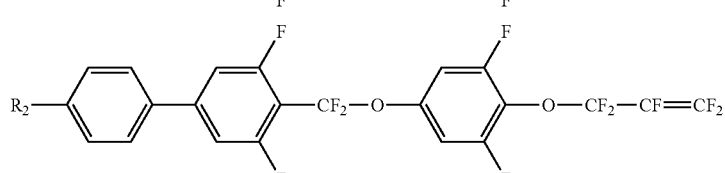
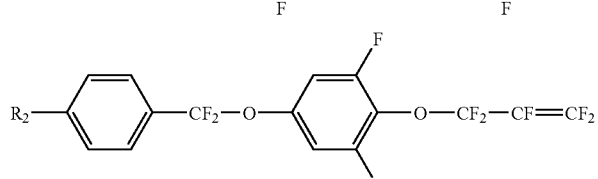
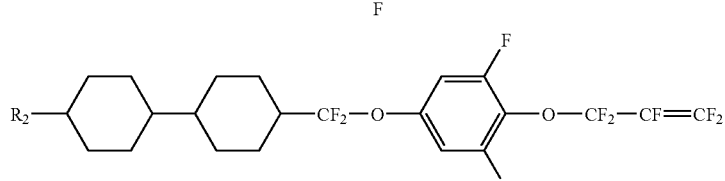
[Formula 13-2]
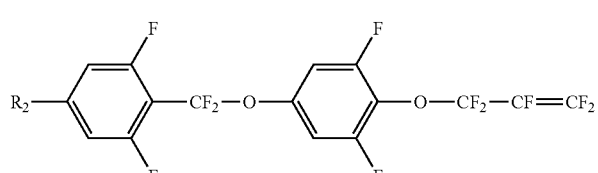
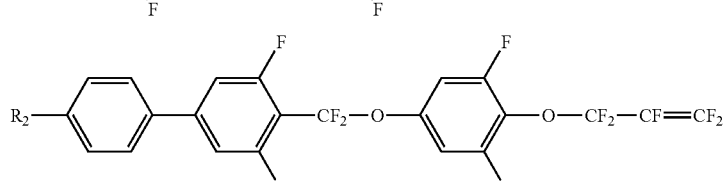

-continued
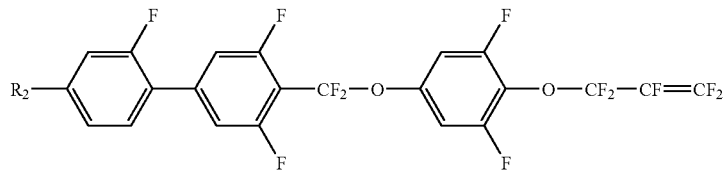
[Formula 14]
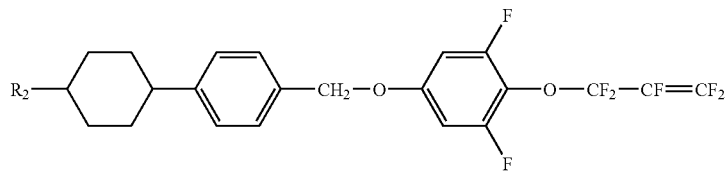
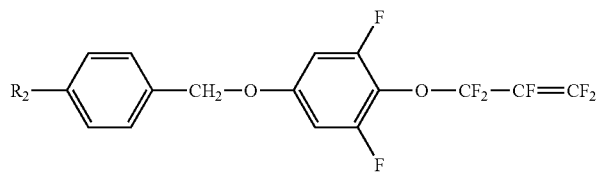
[Formula 15]
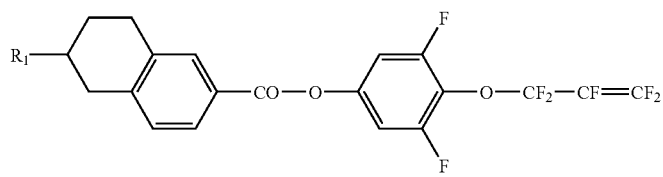
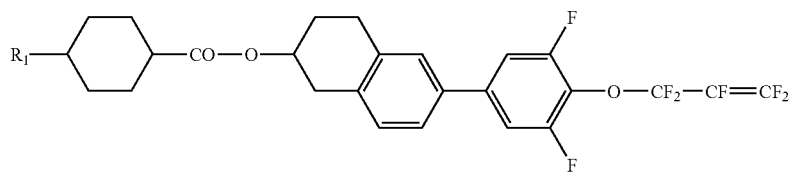
[Formula 16]
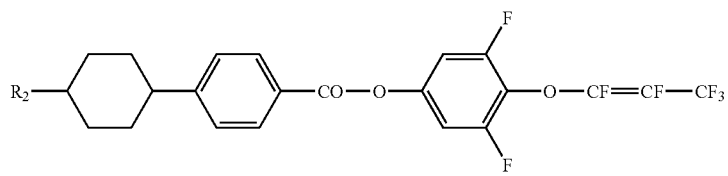
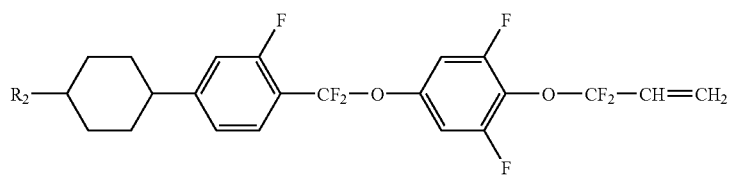
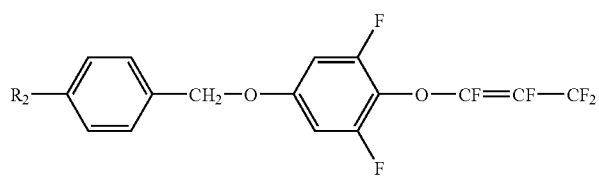

The liquid crystal composition of the present invention preferably contains at least one compound represented by general formula (III) below (component A) for increasing the specific resistance and preventing photo- or thermal degradation.

[Formula 17]

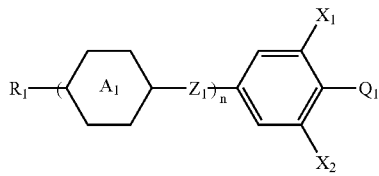

(III)

(In the formula, $R_1$ represents $R_0$, $R_0O$, $R_0OCO$, or $R_0COO$; $R_0$ represents an alkyl group, in which (an) unsaturated bond(s) may be contained, the —$CH_2$— group(s) may be replaced by —O—, —CO—, or —COO—, and part or all of the hydrogen atoms may be replaced by a halogen atom or cyano group;

$A_1$ is 1,4-phenylene [wherein the —CH= group(s) may be replaced by —N= and the hydrogen atom(s) may be replaced by a halogen atom or cyano group], 1,4-cyclohexylene [wherein the —$CH_2$— group(s) may be replaced by —O— or —S— and the hydrogen atom(s) may be replaced by a halogen atom or cyano group], or 2,6-naphthylene;

$Z_1$ is a single bond, —$CH_2CH_2$—, —CH=CH—, —$(CH_2)_4$—, —C≡C—, or —$CF_2CF_2$—;

$X_1$ and $X_2$ each independently represent a hydrogen or fluorine atom;

$Q_1$ represents a halogen atom, haloalkyl group, haloalkoxy group, haloalkenyl group, or haloalkenyloxy group;

n is a number of 1 to 3; and when n is 2 or 3, a plurality of $A_1$ may be different and a plurality of $Z_1$ may be different.)

Some compounds represented by general formula (III) (component A) are included in the compounds having a terminal structure represented by general formula (I). Compound in which $X_1$ and $X_2$ are fluorine atoms and $Q_1$ is a $C_{1-8}$ haloalkoxy or haloalkenyloxy group in general formula (III) are included in the compounds having a terminal structure represented by general formula (I). Such compounds are preferably used as the compounds having a terminal structure represented by general formula (I).

In the liquid crystal composition of the present invention, the content of component A is preferably 50% to 99% by mass including the component included in the compounds having a terminal structure represented by general formula (I) and it is preferably 35 to 85% by mass excluding the component included in the compounds having a terminal structure represented by general formula (I).

Among the compounds represented by general formula (III), preferable are compounds represented by any of general formulae (III-1) to (III-3) below.

[Formula 18]

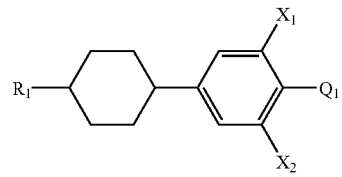

(III-1)

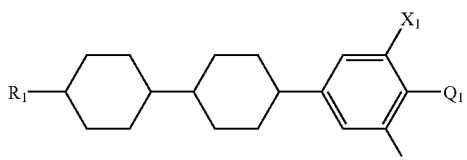

(III-2)

(III-3)

(In the formulae, $R_1$, $X_1$, $X_2$, and $Q_1$ represent the same as defined in general formula (III). $X_5$ to $X_8$ each independently represent a hydrogen or fluorine atom.)

$R_1$ in general formula (III) is preferably an alkyl or alkenyl group. It is particularly preferred to use a compound in which $R_1$ is an alkyl group and a compound in which $R_1$ is an alkenyl group together as the component A.

When the liquid crystal composition of the present invention further contains at least one compound represented by general formula (IV) below (component B), a more positive dielectric anisotropy (Δ∈) and a lower rotational viscosity ($\gamma_1$) can be attained.

[Formula 19]

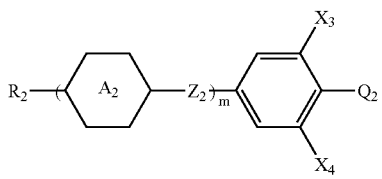

(IV)

(In the formula, $R_2$ represents $R_0$, $R_0O$, $R_0OCO$, or $R_0COO$; $R_0$ represents the same meaning as defined in general formula (III);

$A_2$ is 1,4-phenylene [wherein the —CH= group(s) may be replaced by —N= and the hydrogen atom(s) may be replaced by a halogen atom or cyano group], 1,4-cyclohexylene [wherein the —$CH_2$— group(s) may be replaced by —O— or —S— and the hydrogen atom(s) may be replaced by a halogen atom or cyano group], or 2,6-naphthylene;

$Z_2$ is —COO—, —OCO—, —$CH_2O$—, —$OCH_2$—, —$(CH_2)_3O$—, —$O(CH_2)_3$—, —CH=$CHCH_2O$—, —$OCH_2CH$=CH—, —$CF_2O$—, —$OCF_2$—, —$CH_2CH_2$—COO—, or —OCO—$CH_2CH_2$—;

$X_3$ and $X_4$ each independently represent a hydrogen or fluorine atom;

$Q_2$ represents a halogen atom, haloalkyl group, haloalkoxy group, haloalkenyl group, or haloalkenyloxy group;

m is a number of 1 to 3; and when m is 2 or 3, a plurality of $A_2$ may be different and a plurality of $Z_2$ may be different.)

Some compounds represented by general formula (IV) (component B) are included in the compounds having a terminal structure represented by general formula (I). Compound in which $X_3$ and $X_4$ are fluorine atoms and $Q_2$ is a $C_{1-8}$ haloalkoxy or haloalkenyloxy group in general formula (IV) are included in the compounds having a terminal structure represented by general formula (I). Such compounds are preferably used as the compounds having a terminal structure represented by general formula (I).

In the liquid crystal composition of the present invention, the content of component B is preferably 1 to 50% by mass including the component included in the compounds having a terminal structure represented by general formula (I), and it is preferably 0 to 50% by mass excluding the component included in the compounds having a terminal structure represented by general formula (I).

Among the compounds represented by general formula (IV), preferable are compounds represented by any of general formulae (IV-1) to (IV-3) below.

(IV-1)

[Formula 20]

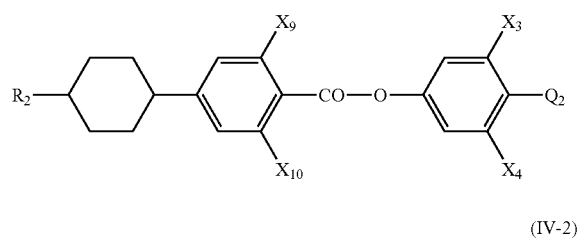

(IV-2)

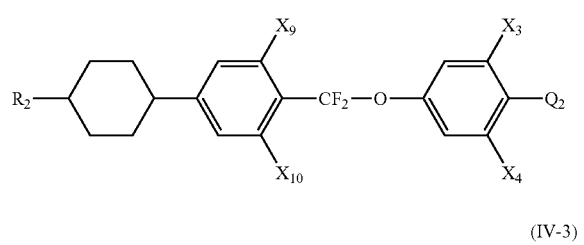

(IV-3)

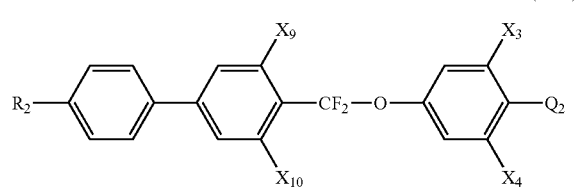

(In the formulae, $R_2$, $X_3$, $X_4$, and $Q_2$ represent the same meaning as those in general formula (IV). $X_9$ and $X_{10}$ each independently represent a hydrogen or fluorine atom.)

$R_1$ in general formula (III) and $R_2$ in general formula (IV) are $R_0$, $R_0O$, $R_0OCO$, or $R_0COO$, and $R_0$ represents an alkyl group. The alkyl group represented by $R_0$ includes, for example, methyl, ethyl, propyl, butyl, pentyl, hexyl, heptyl, octyl, nonyl, decyl, vinyl, allyl, butenyl, ethynyl, propynyl, butynyl, methoxymethyl, ethoxymethyl, propoxymethyl, butoxymethyl, methoxyethyl, ethoxyethyl, perfluoromethyl, perfluoroethyl, perfluoropropyl, monofluoromethyl, difluoromethyl, 2,2,2-trifluoroethyl, perfluorovinyl, perfluoroallyl, isopropyl, 1-methylpropyl, 2-methylpropyl, 2-butylmethyl, 3-methylbutyl, 2-methylpentyl, 3-methylpentyl, 2-ethylhexyl, 2-propylpentyl, 1-methylpentyl, and the like. Among these, $C_{1-8}$ groups are preferred.

$A_1$ in general formula (III) and $A_2$ in general formula (IV) are 1,4-phenylene [wherein the —CH= group(s) may be replaced by —N= and the hydrogen atom(s) may be replaced by a halogen atom or cyano group], 1,4-cyclohexylene [wherein the —CH$_2$— group(s) may be replaced by —O— or —S— and the hydrogen atom(s) may be replaced by a halogen atom or cyano group], or 2,6-naphthylene, specifically including cyclic groups exemplified below.

[Formula 21]

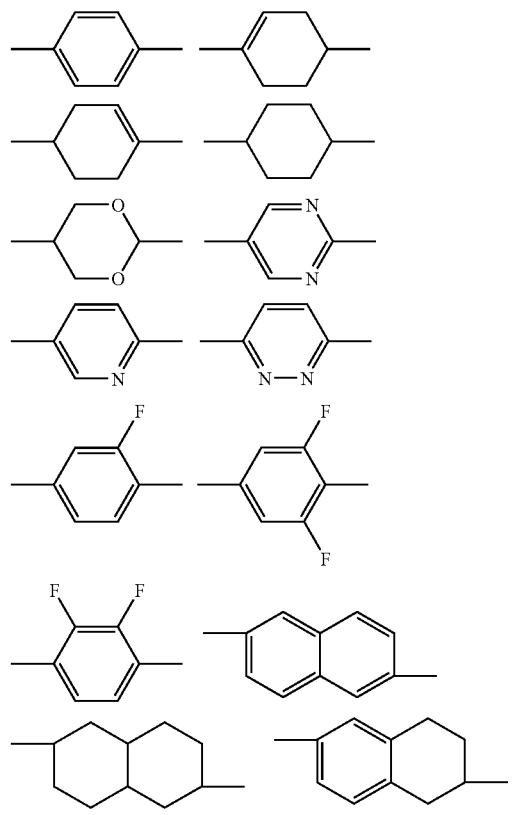

In general formulae (III) and (IV), the haloalkyl group represented by $Q_1$ or $Q_2$ includes monofluoromethyl, difluoromethyl, trifluoromethyl, 2-monofluoroethyl, 2,2,2-trifluoroethyl, perfluoroethyl, perfluoropropyl, perfluorobutyl, and the like; the haloalkoxy group includes those derived from these haloalkyl groups; the haloalkenyl group includes perfluoroallyl, perfluoro-1-propenyl, 1,1-difluoroallyl, perfluoro-3-butenyl, perfluoro-4-pentenyl, and the like; and the haloalkenyloxy group includes those derived from these haloalkenyl groups. Among these, $C_{1-3}$ groups are preferred.

Specific examples of the compound represented by general formula (III) include the compounds listed in [Formula 3] to [Formula 10] above and also include the following compounds, although not limited thereto. In the following compounds, $R_1$ is the same as defined in general formula (III).

[Formula 22]
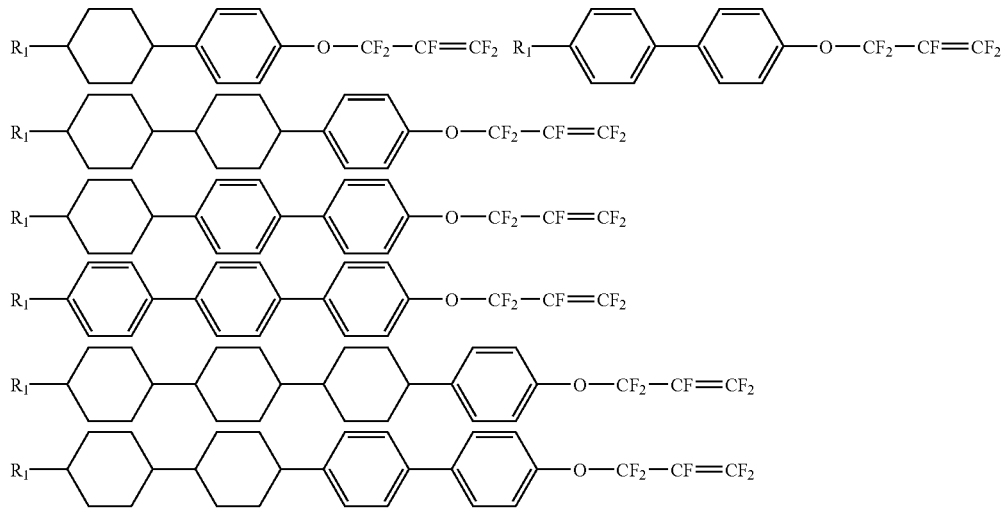
[Formula 23]
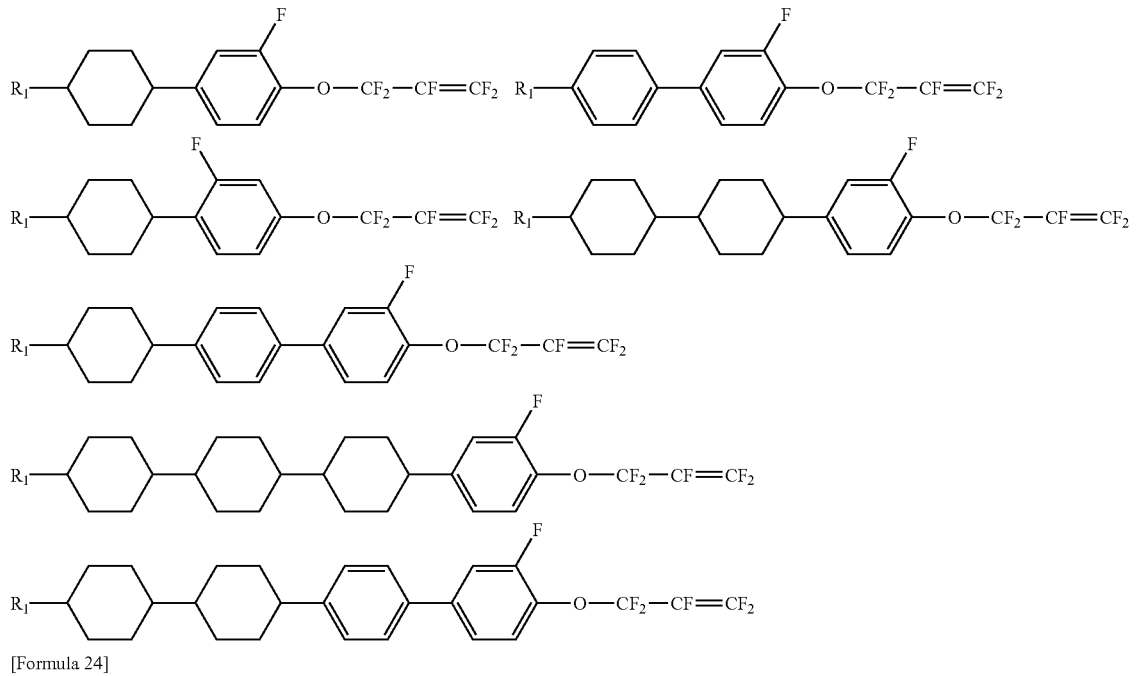
[Formula 24]
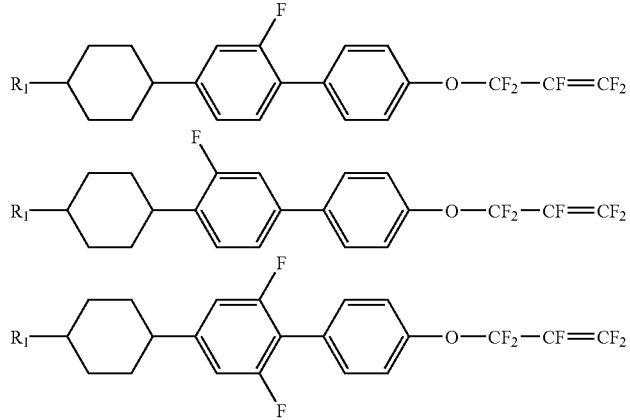

-continued
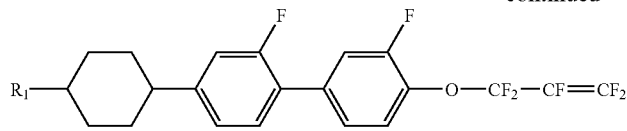
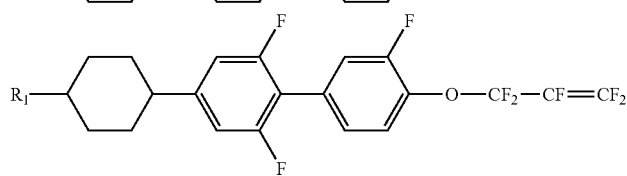
[Formula 25]
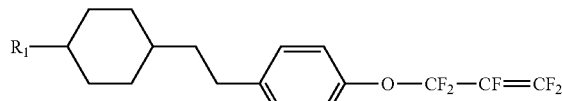
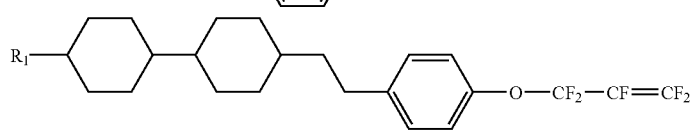
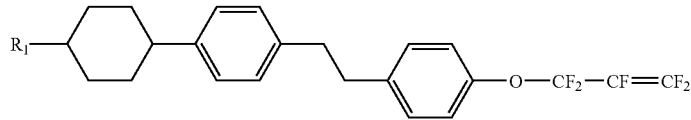
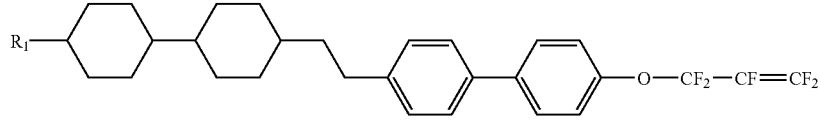
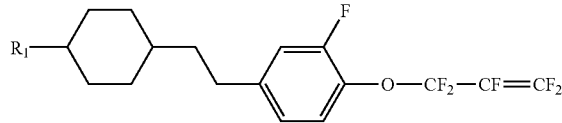
[Formula 26]
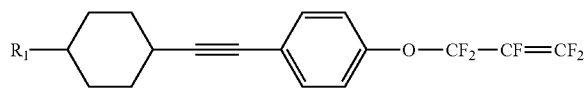
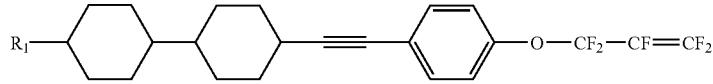
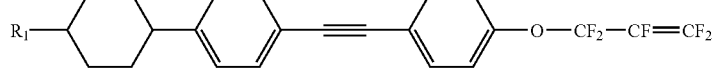
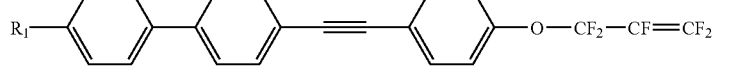
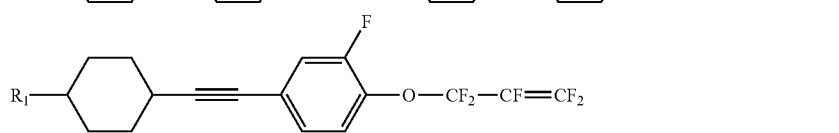

-continued
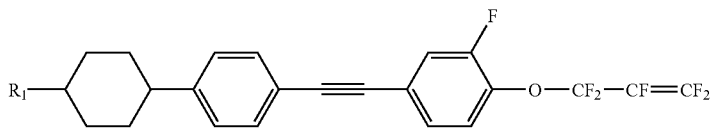
[Formula 27]
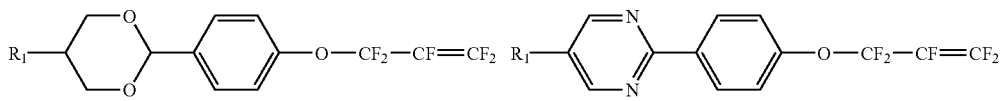
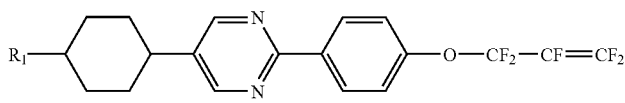
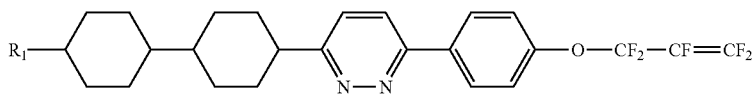
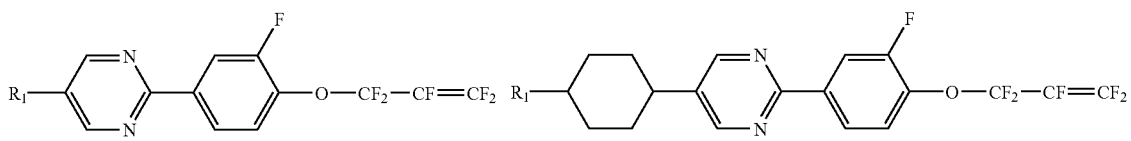
[Formula 28]
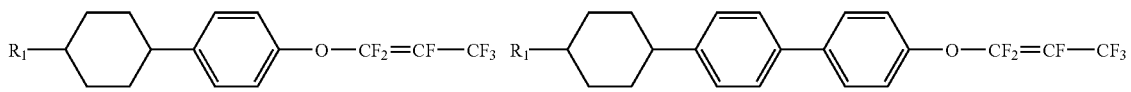
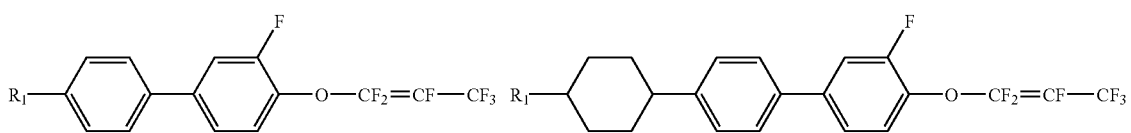
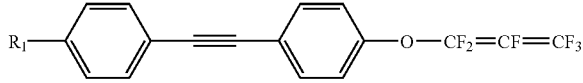
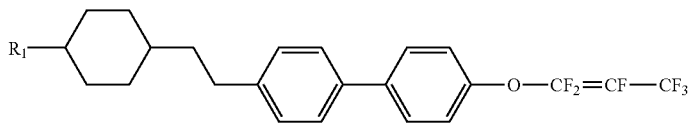
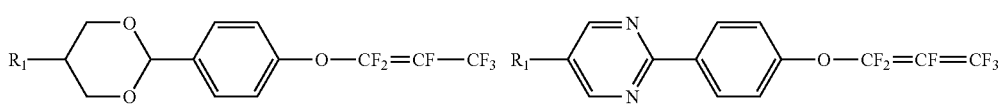
[Formula 29]
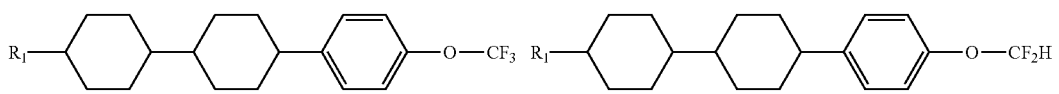
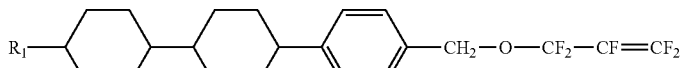
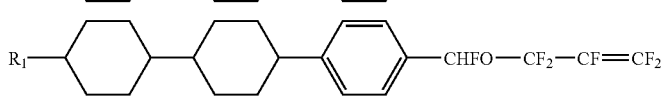
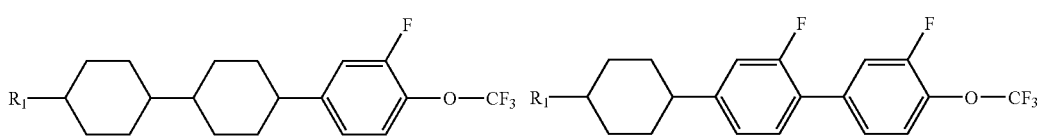

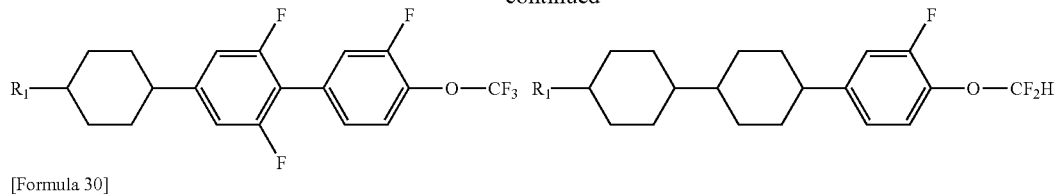
[Formula 30]
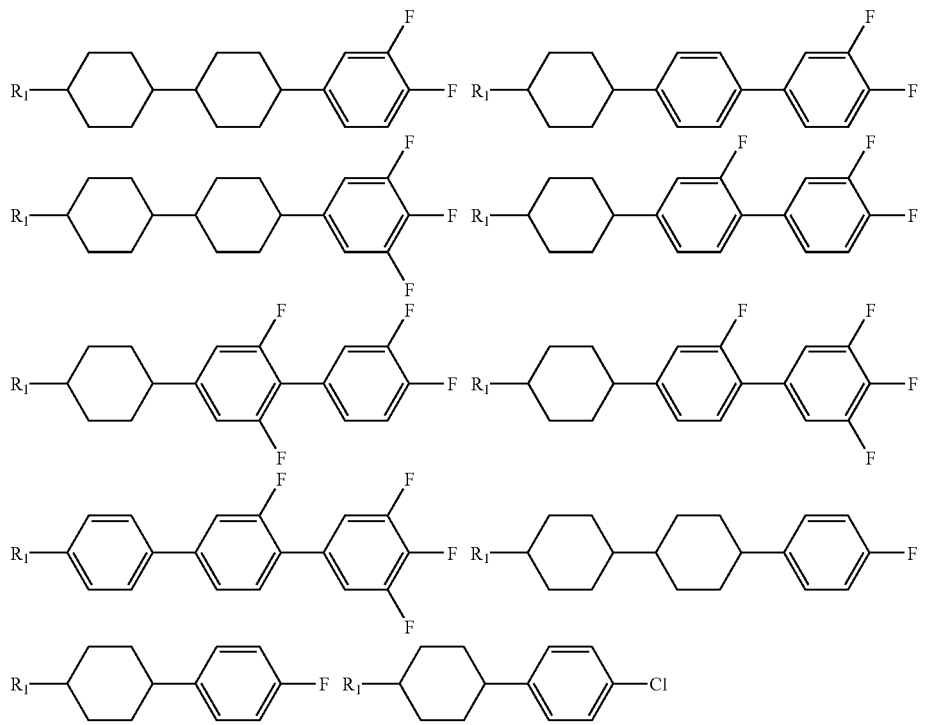
Specific examples of the compound represented by general formula (IV) include the compounds exemplified in [Formula 11] to [Formula 16] above and also include the following compounds, although not limited thereto. In the following compounds, $R_2$ is the same as defined in general formula (IV).
[Formula 31]
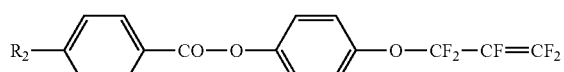
-continued
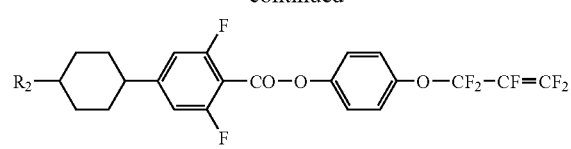
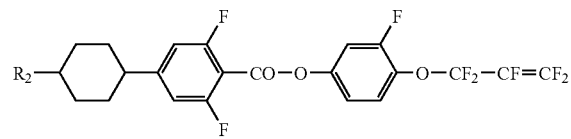
[Formula 32]
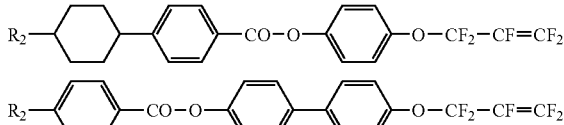
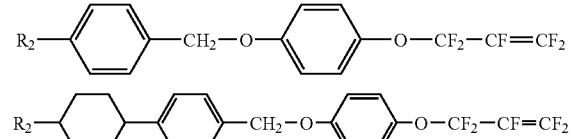
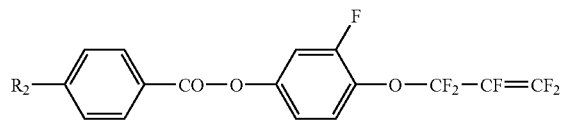
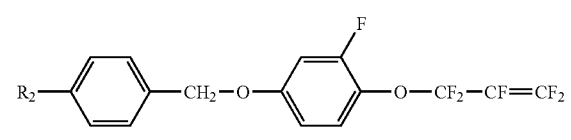
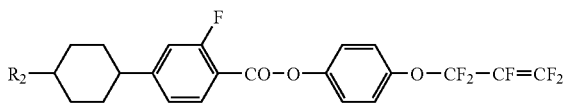

-continued

[Formula 33]

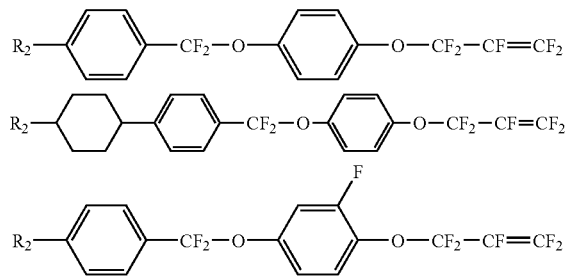

[Formula 34]

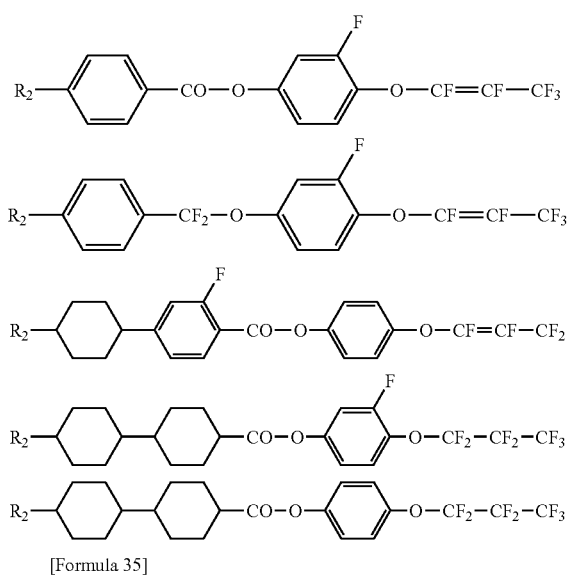

[Formula 35]

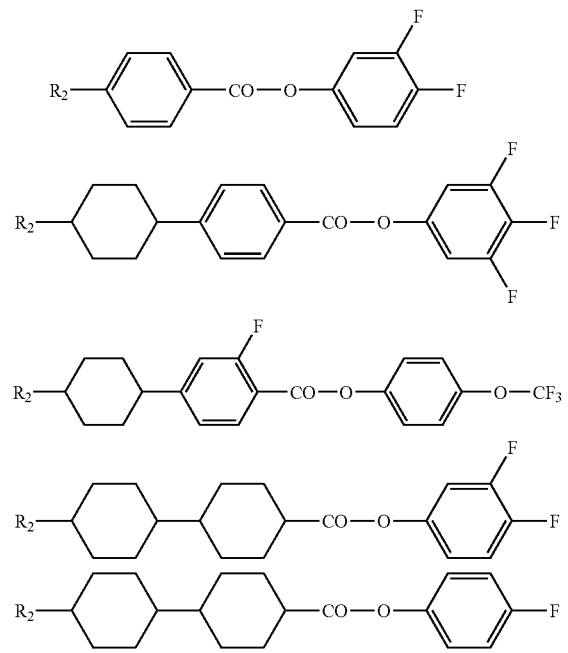

-continued

[Formula 36]

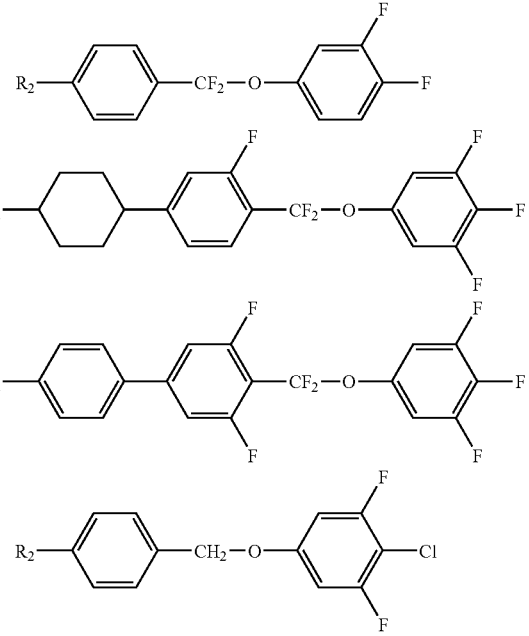

In the liquid crystal composition of the present invention, the sum of component A and component B is preferably 100% by mass.

The liquid crystal composition of the present invention may contain a known liquid crystal compound or liquid crystal analogue. Such liquid crystal compounds or liquid crystal analogues include, for example, compounds represented by general formula (V) in [Formula 37] below [except compounds having a terminal structure represented by general formula (I) and compounds represented by general formula (III) or (IV)].

(V)

[Formula 37]

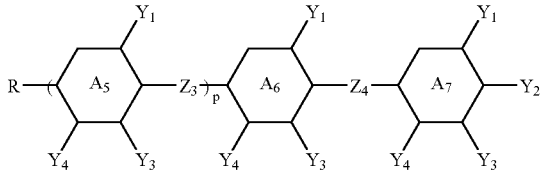

(In the formula, R represents a hydrogen atom or $C_{1-8}$ alkyl, alkoxy, alkenyl, alkenyloxy, alkynyl, alkynyloxy, alkoxyalkyl, alkanoyloxy, or alkoxycarbonyl group optionally substituted with a halogen atom, cyano group, or the like; $Y_2$ represents a cyano group, halogen atom, or group represented by R; $Y_1$, $Y_3$, and $Y_4$ each represent a hydrogen atom, halogen atom, or cyano group; $Z_3$ and $Z_4$ each independently represent a direct bond, —CO—O—, —O—CO—, —CH$_2$O—, —OCH$_2$—, —CH$_2$CH$_2$—, —CH═CHCH$_2$O, —CF$_2$O—, —OCF$_2$—, or —C═C—, p represents 0, 1, or 2; and rings $A_5$, $A_6$, and $A_7$ each independently represent a benzene, cyclohexane, cyclohexene, pyrimidine, or dioxane ring.)

Accordingly, specific examples of compound represented by general formula (V) include compounds represented by

[Formula 38] and [Formula 39] below. In these compounds, R, $Y_1$, $Y_2$, $Y_3$, and $Y_4$ represent the same meanings as those in general formula (V).
[Formula 38]
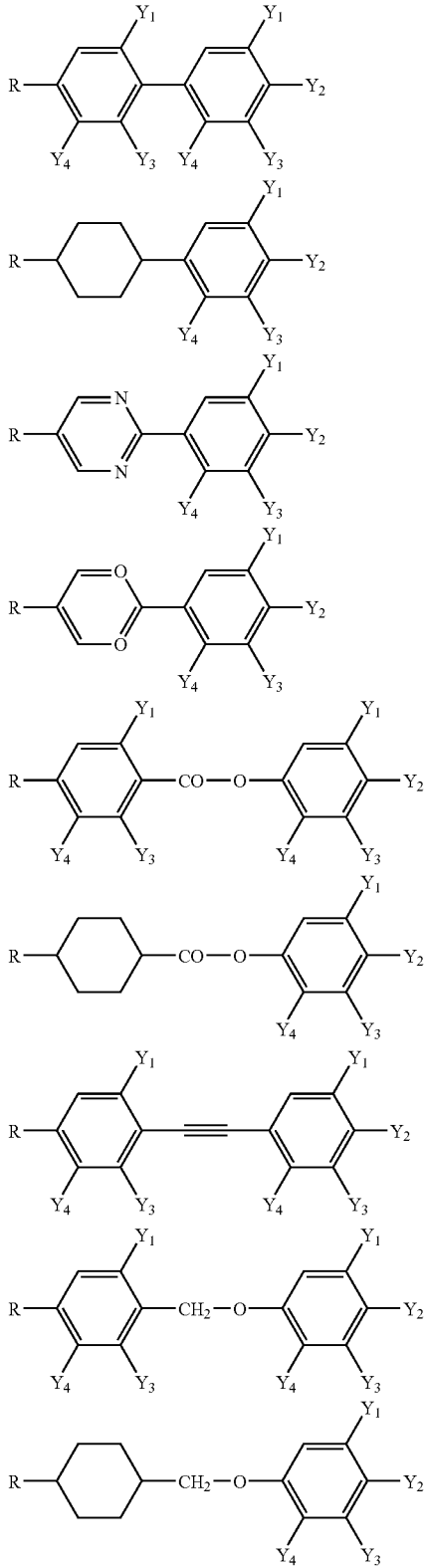
-continued
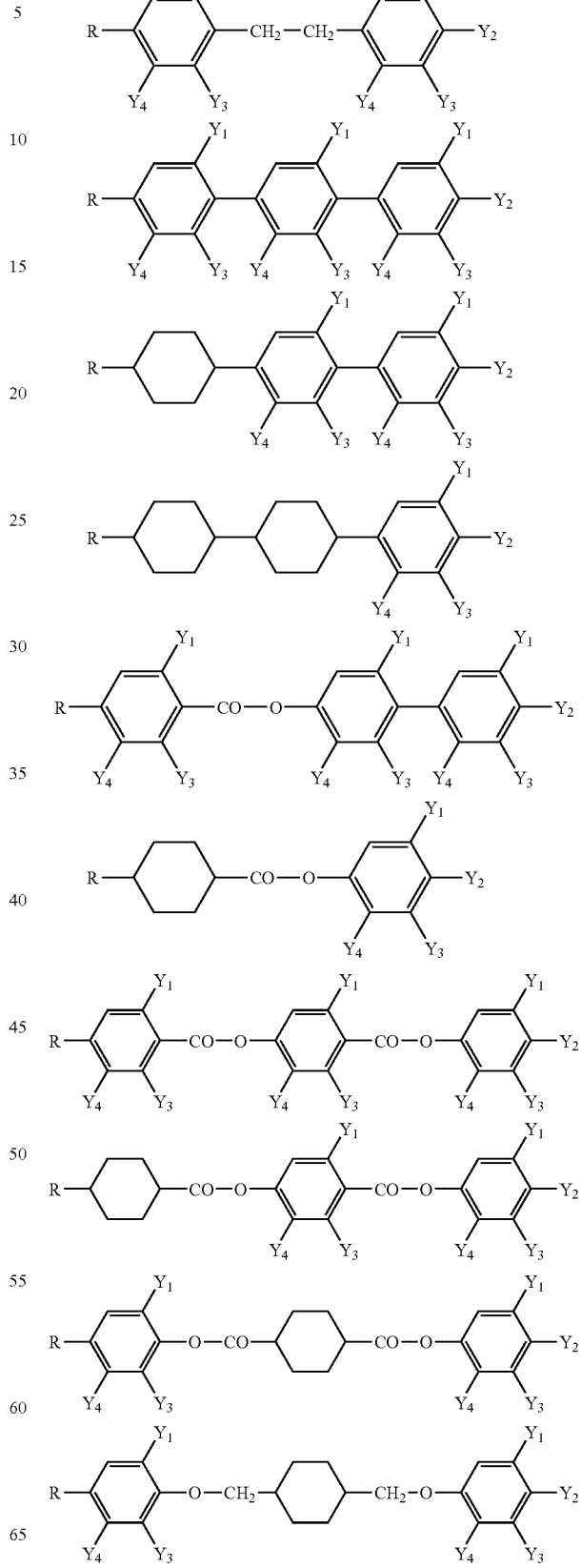

-continued
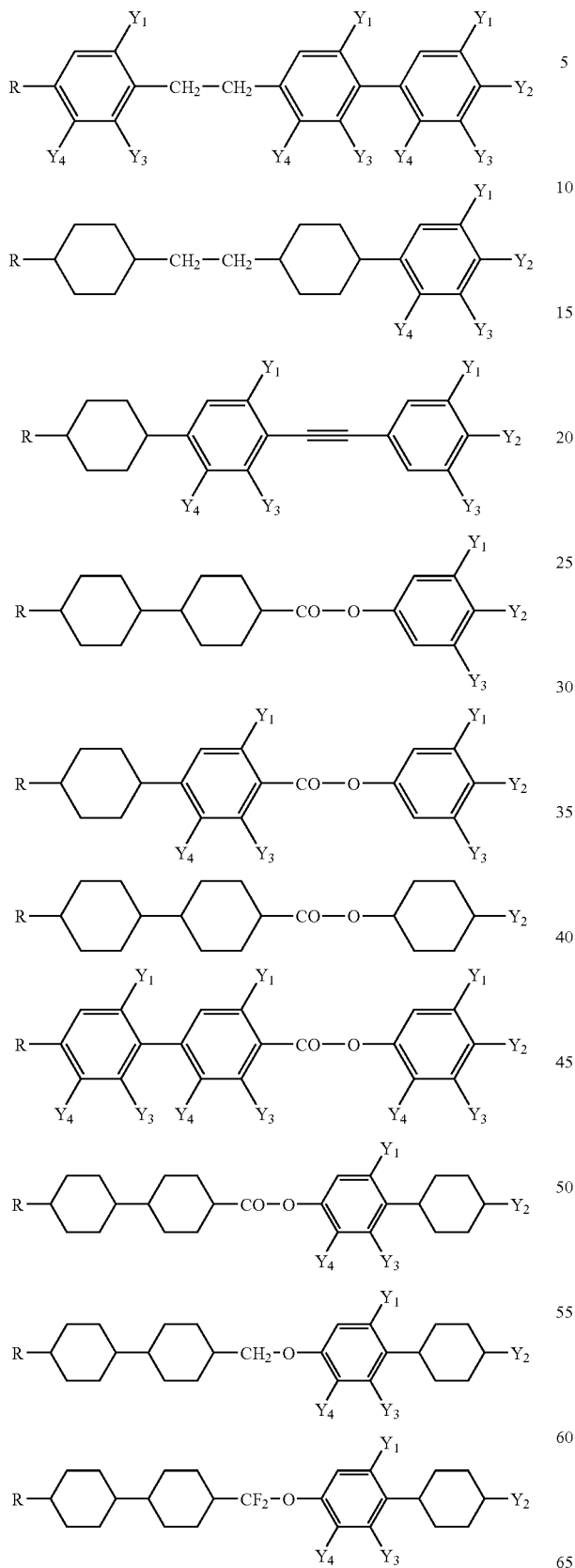
[Formula 39]
-continued
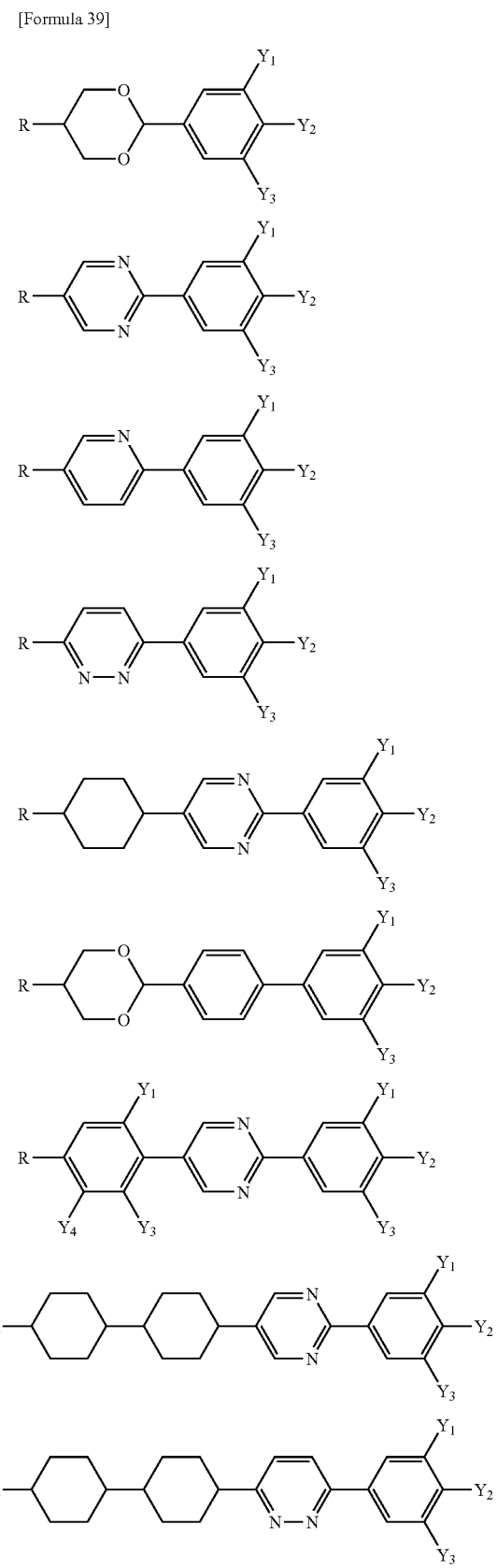

-continued

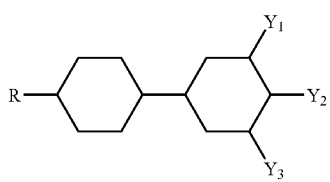

Among these liquid crystal compounds or liquid crystal analogues, the compounds exemplified below are components that can increase the dielectric anisotropy ($\Delta\epsilon$) without increasing the rotational viscosity ($\gamma_1$).

[Formula 40]

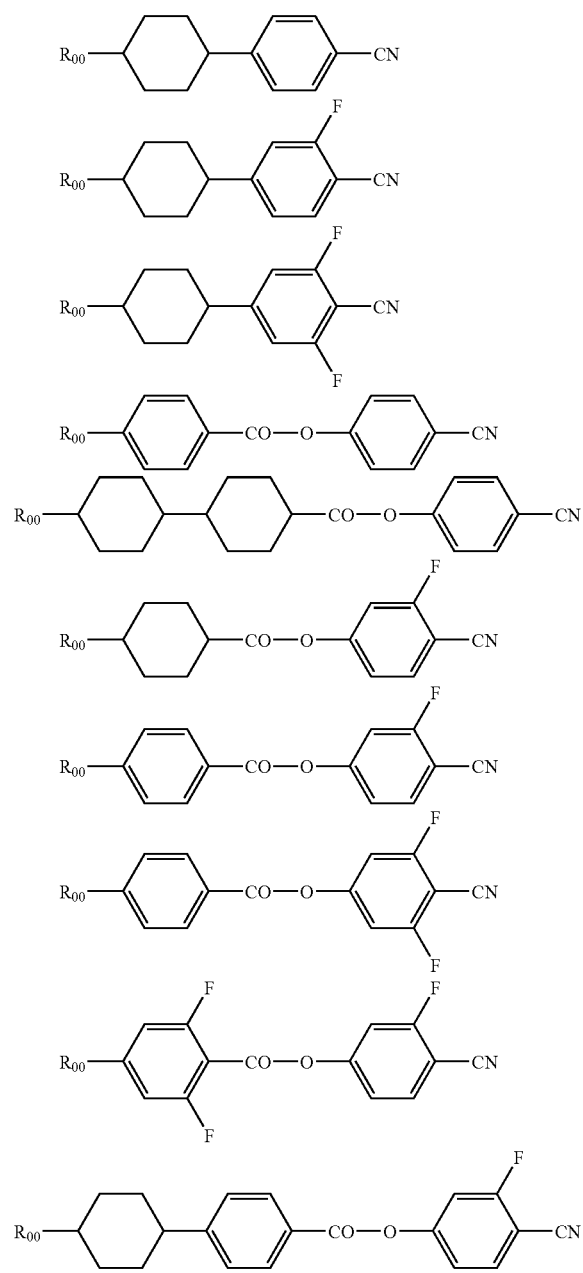

-continued

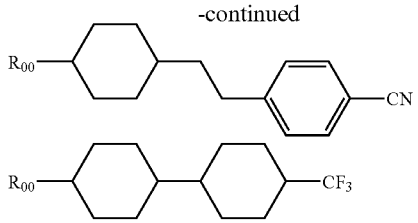

(In the formulae, $R_{00}$ represents an alkyl, alkenyl, alkoxy, or alkenyloxy group.)

Among these liquid crystal compounds or liquid crystal analogues, such compounds as exemplified below, that is, non-polar components, can improve the electro-optical properties, reliability, and the like.

[Formula 41]

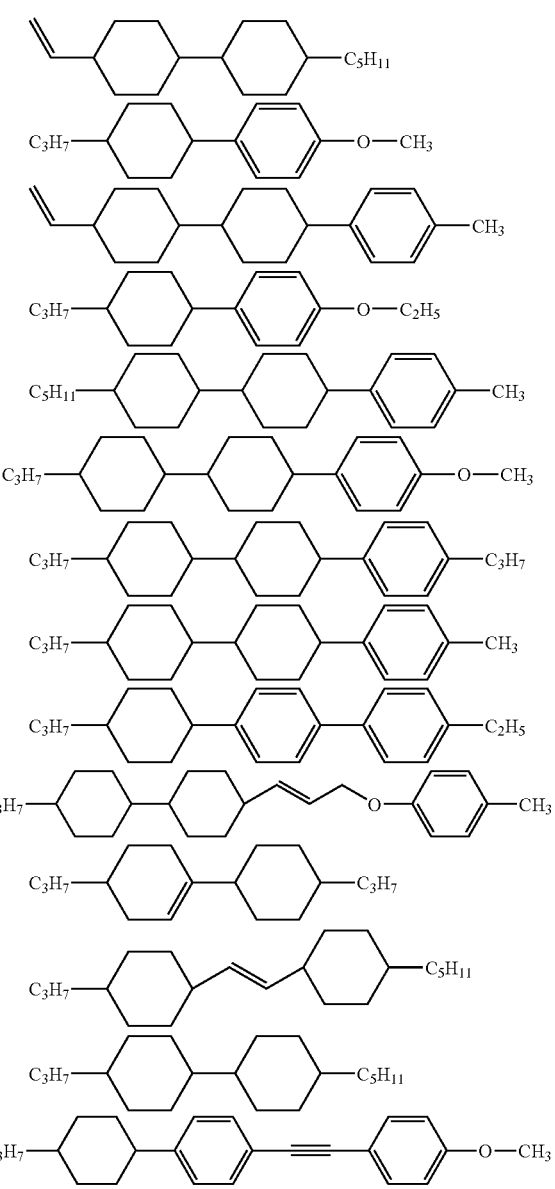

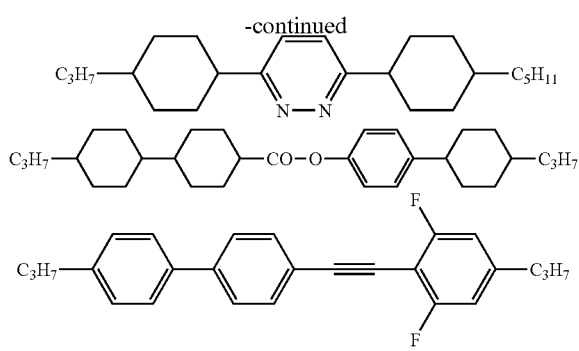

The liquid crystal composition of the present invention may also contain a known chiral agent. The chiral agent includes, for example, the following compounds.

[Formula 42]

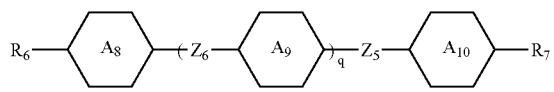

(VI)

(In the formulae, $R_6$ and $R_7$ each independently represent an alkyl, alkoxy, alkylcarbonylalkoxy, or alkoxycarbonyl group, which may be interrupted by an ether linkage, may be substituted with a halogen atom and/or cyano group, and may contain an unsaturated bond; $A_8$, $A_9$, and $A_{10}$ each independently represent 1,4-phenylene, trans-1,4-cyclohexanediyl, 2-fluoro-1,4-phenylene, 3-fluoro-1,4-phenylene, or 1,4-cyclohexenylene, and these rings may be substituted with a halogen atom and/or cyano group; $Z_5$ and $Z_6$ each independently represent —COO—, —OCO—, —CH$_2$CH$_2$—, —CH=CH—, —(CH$_2$)$_4$—, —CH$_2$O—, —OCH$_2$—, —(CH$_2$)$_3$O—, —O(CH$_2$)$_3$—, —CH=CHCH$_2$O—, —OCH$_2$CH=CH—, —C≡C—, —CF$_2$O—, —OCF$_2$—, —CFHCFH—, or a single bond; and q represents 0, 1, or 2, provided that at least one or more asymmetric carbon atoms are present.)

[Formula 43]

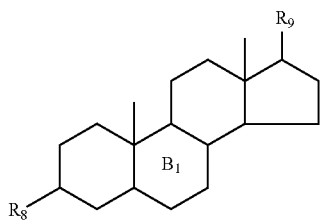

(VII)

(In the formula, $R_8$ represents a hydrogen atom, halogen atom, alkyl, alkoxy, alkylcarbonyloxy, or alkoxycarbonyl group, optionally substituted aryl, aryloxy, arylcarbonyloxy, or aryloxycarbonyl group, or the like, and in these groups, the hydrogen atom(s) may be replaced by a halogen atom, and the ethylene group(s) may be replaced by an ethenylene or ethynylene group. $R_9$ represents an alkyl or alkenyl group. $B_1$ represents a condensed ring having only one double bond without sharing it with another ring, and the condensed ring may be substituted with an alkyl and/or alkoxy group.)

Specific examples of the chiral agent include the following compounds.

[Formula 44]

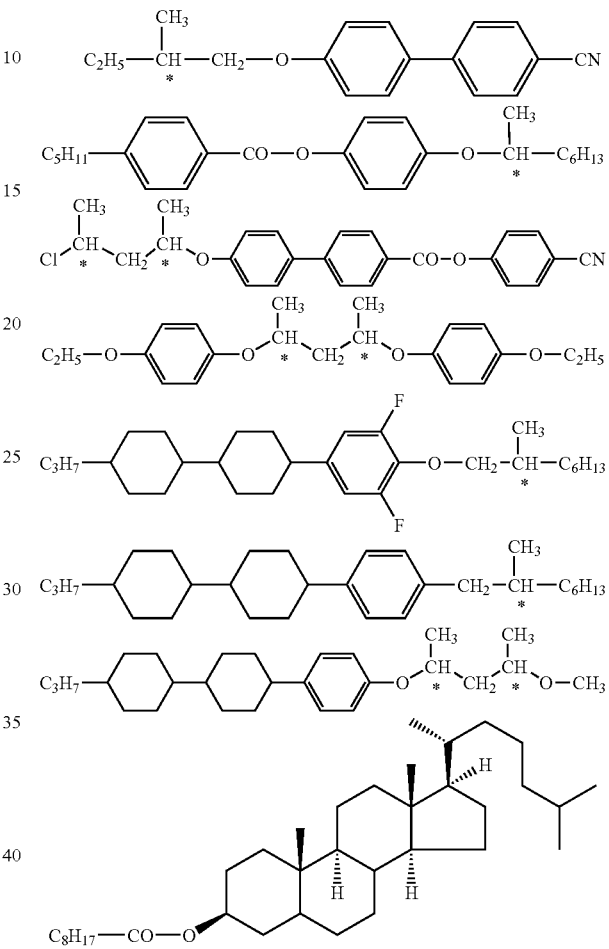

There may be also used, for example, chiral agents proposed in Japanese Patent Laid-Open Publication No. S63-175095, Japanese Patent Laid-Open Publication No. H1-242542, Japanese Patent Laid-Open Publication No. H1-258635, Japanese Patent Laid-Open Publication No. H6-200251, Japanese Patent Laid-Open Publication No. 2002-308833, and the like.

These chiral agents may be used alone or in combination of two or more. In this case, there may be used a combination of chiral agents different in helical twist direction or a combination of chiral agents with the same twist direction. Furthermore, for example, as proposed in Japanese Patent Laid-Open Publication No. H7-258641, there may be combined a chiral agent with positive temperature dependence of the rotatory power in its cholesteric phase and a chiral agent with negative temperature dependence of the rotatory power in its cholesteric phase.

The pitch may be adjusted in a range of 0.2μ to 300μ by changing the chiral agent and its concentration.

For attaining excellent long-term stability to light and heat, the liquid crystal composition of the present invention may contain an ultraviolet absorber such as benzotriazole-type, benzophenone-type, triazine-type, benzoate-type, oxanilide-type, and cyanoacrylate-type ultraviolet absorbers; a hindered amine light stabilizer; an antioxidant such as phenol-type, phosphorus-containing, and sulfur-containing antioxidants; and the like.

The liquid crystal composition of the present invention may contain a surfactant or the like for attaining antistatic effect. Such surfactants include, for example, compounds proposed in Japanese Patent Laid-Open Publication No. S59-4676, Japanese Patent Laid-Open Publication No. H4-36384, Japanese Patent Laid-Open Publication No. H4-180993, Japanese Patent Laid-Open Publication No. H11-212070, Japanese Patent Laid-Open Publication No. H8-337779, Japanese Patent Laid-Open Publication No. H9-67577, Japanese Patent Laid-Open Publication No. 2003-342580, and the like.

The liquid crystal composition of the present invention may be enclosed in a liquid crystal cell to configure various electro-optic display elements. To such electro-optic display elements, there may be applied various types of display modes, for example, dynamic scattering (DS), guest-host (GH), twist nematic (TN), super twist nematic (STN), thin film transistor (TFT), thin film diode (TFD), ferroelectric liquid crystal (FLC), antiferroelectric liquid crystal (AFLC), polymer dispersion liquid crystal (PD), vertical alignment (VA), in-plane switching (IPS), cholesteric-nematic phase transfer-type, and the like; and there may be applied various driving systems such as static driving, time-division driving, active matrix driving, and dual-frequency driving.

Since the liquid crystal composition of the present invention has a high dielectric anisotropy ($\Delta\epsilon$) and a low rotational viscosity ($\gamma_1$), electro-optic display elements obtained using the liquid crystal composition of the present invention are suitably used for IPS liquid crystal displays and low voltage-driven TN liquid crystal displays driven at a low voltage of 4 V or less (for example, 3.3 V or 2.5 V).

Such electro-optic display elements obtained using the liquid crystal composition of the present invention can be used for liquid crystal displays used in clocks, calculators, measuring instruments, automotive meters, copiers, cameras, OA equipment, portable personal computers, portable phones, and the like. Such electro-optic display elements can be also used for other applications, for example, photochromic windows, light-shielding shutters, polarization converters, and the like. Particularly, based on the characteristics, these elements are suitably used for liquid crystal displays used in monitors having large display area, wide-screen televisions, and portable information terminals such as PDA, portable personal computers and portable phones.

EXAMPLES

Hereafter, the present invention will be further detailed with Examples and the like. However, the present invention is not limited by Examples and the like below.

The following abbreviations are used in Examples and the like below.

CY: 1,4-cyclohexylene
PH: 1,4-phenylene
PHnF: n-fluoro-1,4-phenylene (If n is not described, it represents 4-fluoro.)
Dio: 1,3-dioxane-5,2-diyl
Pym: pyrimidine-5,2-diyl
Pyd: pyridazine-3,6-diyl
CE: 4,1-cyclohexenylene
Cn: Linear alkyl having n carbon atoms Example 1

A liquid crystal composition was prepared as the following blend.

| [blend] | parts by mass |
| --- | --- |
| C3—CY—PH—OCF$_2$CF=CF$_2$ | 30.4 |
| C4—CY—PH—OCF$_2$CF=CF$_2$ | 5.7 |
| C2—CY—CY—PH3F—OCF$_2$CF=CF$_2$ | 10.45 |
| C3—CY—CY—PH3F—OCF$_2$CF=CF$_2$ | 12.35 |
| C3—CY—CY—PH3,5-diF—OCF$_2$CF=CF$_2$ | 16.15 |
| C4—CY—CY—PH3,5-diF—OCF$_2$CF=CF$_2$ | 3.8 |
| C5—CY—CY—PH3,5-diF—OCF$_2$CF=CF$_2$ | 7.6 |
| C3—CY—PH—PH3,5-diF—OCF$_2$CF=CF$_2$ | 8.55 |
| C3—CY—PH—COO—PH3,5-diF—OCF$_2$CF=CF$_2$ | 5 |

Example 2

A liquid crystal composition was prepared as the following blend.

| [blend] | parts by mass |
| --- | --- |
| C3—CY—PH—OCF$_2$CF=CF$_2$ | 9.5 |
| C4—CY—PH—OCF$_2$CF=CF$_2$ | 4.75 |
| C3—CY—PH3F—OCF$_2$CF=CF$_2$ | 14.25 |
| C5—CY—PH3F—OCF$_2$CF=CF$_2$ | 7.6 |
| C2—CY—CY—PH3F—OCF$_2$CF=CF$_2$ | 12.35 |
| C3—CY—CY—PH3,5-diF—OCF$_2$CF=CF$_2$ | 16.15 |
| C4—CY—CY—PH3,5-diF—OCF$_2$CF=CF$_2$ | 7.6 |
| C5—CY—CY—PH3,5-diF—OCF$_2$CF=CF$_2$ | 17.1 |
| C3—CY—PH—PH3,5-diF—OCF$_2$CF=CF$_2$ | 5.7 |
| C3—CY—CY—COO—PH—F | 5 |

Example 3

A liquid crystal composition was prepared as the following blend.

| [blend] | parts by mass |
| --- | --- |
| C3—CY—PH—OCF$_2$CF=CF$_2$ | 9.5 |
| C4—CY—PH—OCF$_2$CF=CF$_2$ | 4.75 |
| C3—CY—PH3F—OCF$_2$CF=CF$_2$ | 14.25 |
| C5—CY—PH3F—OCF$_2$CF=CF$_2$ | 7.6 |
| C2—CY—CY—PH3F—OCF$_2$CF=CF$_2$ | 12.35 |
| C3—CY—CY—PH3,5-diF—OCF$_2$CF=CF$_2$ | 16.15 |
| C4—CY—CY—PH3,5-diF—OCF$_2$CF=CF$_2$ | 7.6 |
| C5—CY—CY—PH3,5-diF—OCF$_2$CF=CF$_2$ | 17.1 |
| C3—CY—PH—PH3,5-diF—OCF$_2$CF=CF$_2$ | 5.7 |
| C3—CY—CY—COO—PH3,5-diF—OCF$_2$CF=CF$_2$ | 5 |

Example 4

A liquid crystal composition was prepared as the following blend.

| [blend] | parts by mass |
|---|---|
| C3-CY—PH—OCF$_2$CF=CF$_2$ | 21 |
| C4-CY—PH—OCF$_2$CF=CF$_2$ | 5 |
| C5-CY—PH3F—OCF$_2$CF=CF$_2$ | 5 |
| C2-CY—CY—PH3F—OCF$_2$CF=CF$_2$ | 9 |
| C3-CY—CY—PH3F—OCF$_2$CF=CF$_2$ | 12 |
| C3-CY—CY—PH3,5-diF—OCF$_2$CF=CF$_2$ | 11 |
| C4-CY—CY—PH3,5-diF—OCF$_2$CF=CF$_2$ | 5 |
| C5-CY—CY—PH3,5-diF—OCF$_2$CF=CF$_2$ | 10 |
| C3-CY—PH—PH3,5-diF—OCF$_2$CF=CF$_2$ | 14 |
| C5-CY—COO—PH—F | 8 |

Comparative Example 1

A liquid crystal composition was prepared as the following blend.

| [blend] | parts by mass |
|---|---|
| C2-CY—CY—PH3,4-diF | 15 |
| C3-CY—CY—PH3,4-diF | 17 |
| C4-CY—CY—PH3,4-diF | 15 |
| C5-CY—CY—PH3,4-diF | 12 |
| C3-CY—PH—PH3,4-diF | 4 |
| C4-CY—PH—PH3,4-diF | 3 |
| C5-CY—PH—PH3,4-diF | 6 |
| C7-CY—PH—F | 13 |
| C2-CY—CY—PH3,4,5-triF | 5 |
| C2-CY—CY—PH3,5-diF—OCF$_2$H | 4 |
| C3-CY—PH—PH3,4,5-triF | 6 |

The characteristic values of liquid crystal compositions obtained in Examples 1 to 4 and Comparative Example 1 are shown in [Table 1] below.

Example 5

A liquid crystal composition was prepared as the following blend.

| [blend] | parts by mass |
|---|---|
| C3-PH—PH3F—OCF$_2$CF=CF$_2$ | 7 |
| C3-CY—PH—OCF$_2$CF=CF$_2$ | 16 |
| C3-CY—PH3F—OCF$_2$CF=CF$_2$ | 3 |
| C2-CY—CY—PH3F—OCF$_2$CF=CF$_2$ | 9 |
| C3-CY—CY—PH3F—OCF$_2$CF=CF$_2$ | 18 |
| C3-CY—CY—PH3,5-diF—OCF$_2$CF=CF$_2$ | 6 |
| C3-CY—PH—PH3,5-diF—OCF$_2$CF=CF$_2$ | 16 |
| C3-CY—PH3F—COO—PH3,5-diF—OCF$_2$CF=CF$_2$ | 5 |
| CH$_2$=CH—CY—CY—PH3,5-diF—OCF$_2$CF=CF$_2$ | 10 |
| CH$_2$=CH—CY—PH—OCF$_2$CF=CF$_2$ | 10 |

Example 6

A liquid crystal composition was prepared as the following blend.

| [blend] | parts by mass |
|---|---|
| C3-PH—PH3F—OCF$_2$CF=CF$_2$ | 10 |
| C3-CY—PH—OCF$_2$CF=CF$_2$ | 10 |
| C4-CY—PH—OCF$_2$CF=CF$_2$ | 5 |
| C3-CY—PH3F—OCF$_2$CF=CF$_2$ | 8 |
| C5-CY—PH3F—OCF$_2$CF=CF$_2$ | 4 |
| C2-CY—CY—PH3F—OCF$_2$CF=CF$_2$ | 12 |
| C3-CY—CY—PH3F—OCF$_2$CF=CF$_2$ | 15 |
| C3-CY—CY—PH3,5-diF—OCF$_2$CF=CF$_2$ | 8 |
| C4-CY—CY—PH3,5-diF—OCF$_2$CF=CF$_2$ | 4 |
| C5-CY—CY—PH3,5-diF—OCF$_2$CF=CF$_2$ | 6 |
| C3-CY—PH—PH3,5-diF—OCF$_2$CF=CF$_2$ | 18 |

TABLE 1

|  | Examples | | | | Comparative Example |
|---|---|---|---|---|---|
|  | 1 | 2 | 3 | 4 | 1 |
| NI Point | 86.8 | 89.9 | 90.3 | 80.0 | 81.0 |
| η | 14 | 16 | 16 | 14 | 24 |
| γ$_1$ | 100 | 113 | 111 | 97 | 133 |
| Δn | 0.0908 | 0.0877 | 0.0887 | 0.0902 | 0.0873 |
| Δe | 5.2 | 5.1 | 5.4 | 4.8 | 5.3 |
| Low-Temperature Storage Stability | −30 | −30 | −30 | −30 | −20 |

NI Point: Nematic-isotropic phase transfer temperature, unit: ° C.

η: Viscosity (20° C.), unit: mPa · s

γ$_1$: Rotational viscosity coefficient (20° C.), unit: mPa · s

Δn: Refractive index anisotropy (25° C., 589 nm)

Δe: Dielectric anisotropy (25° C., 1 kHz)

Low-Temperature Storage Stability: The lowest temperature at which no change was observed in a screw tube for two weeks. Unit: ° C.

Example 7

A liquid crystal composition was prepared as the following blend.

| [blend] | parts by mass |
| --- | --- |
| C3-PH—PH3F—OCF$_2$CF=CF$_2$ | 8 |
| C3-CY—PH—OCF$_2$CF=CF$_2$ | 20 |
| C2-CY—CY—PH3F—OCF$_2$CF=CF$_2$ | 6 |
| C3-CY—CY—PH3F—OCF$_2$CF=CF$_2$ | 16 |
| C2-CY—CY—PH3,5-diF—OCF$_2$CF=CF$_2$ | 11 |
| C3-CY—PH—PH3,5-diF—OCF$_2$CF=CF$_2$ | 14 |
| C3-CY—CY—PH—PH3,5-diF—OCF$_2$CF=CF$_2$ | 6 |
| CH$_2$=CH—CY—CY—PH3,5-diF—OCF$_2$CF=CF$_2$ | 8 |
| CH$_2$=CH—CY—PH—OCF$_2$CF=CF$_2$ | 11 |

Comparative Example 2

A liquid crystal composition was prepared as the following blend.

| [blend] | parts by mass |
| --- | --- |
| C2-CY—CY—PH3,4-diF | 13 |
| C3-CY—CY—PH3,4-diF | 14 |
| C4-CY—CY—PH3,4-diF | 12 |
| C5-CY—CY—PH3,4-diF | 10 |
| C3-CY—PH—PH3,4-diF | 9 |
| C4-CY—PH—PH3,4-diF | 6 |
| C5-CY—PH—PH3,4-diF | 13 |
| C7-CY—PH—F | 4 |
| C2-CY—CY—PH3,5-diF—OCF$_2$H | 3 |
| C3-CY—PH—PH3,4,5-triF | 2 |
| C2-PH—C≡C—PH3,4-diF | 2 |
| C5-CY—PH—C1 | 7 |
| C3-CY—PH—OCH3 | 5 |

The characteristic values of liquid crystal compositions obtained in Examples 5 to 7 and Comparative Example 2 are shown in [Table 2] below.

TABLE 2

| | Examples | | | Comparative Example |
| --- | --- | --- | --- | --- |
| | 5 | 6 | 7 | 2 |
| NI Point | 79.8 | 81.3 | 82.5 | 79.5 |
| η | 15 | 16 | 14 | 21 |
| γ$_1$ | 93 | 95 | 93 | 119 |
| Δn | 0.1005 | 0.1007 | 0.1019 | 0.0991 |
| Δε | 5.1 | 5.2 | 4.8 | 4.8 |
| Low-Temperature Storage Stability | −30 | −30 | −30 | −20 |

NI Point: Nematic-isotropic phase transfer temperature, unit: ° C.
η: Viscosity (20° C.), unit: mPa · s
γ$_1$: Rotational viscosity coefficient (20° C.), unit: mPa · s
Δn: Refractive index anisotropy (25° C., 589 nm)
Δε: Dielectric anisotropy (25° C., 1 kHz)
Low Temperature Storage Stability: The lowest temperature at which no change was observed in a screw tube for two weeks. Unit: ° C.

Example 8

A liquid crystal composition was prepared as the following blend.

| [blend] | parts by mass |
| --- | --- |
| C3-CY—PH—OCF$_2$CF=CF$_2$ | 31 |
| C3-CY—PH3F—OCF$_2$CF=CF$_2$ | 2 |
| C3-CY—CY—PH3F—OCF$_2$CF=CF$_2$ | 3 |
| C3-CY—CY—PH3,5-diF—OCF$_2$CF=CF$_2$ | 18 |
| C4-CY—CY—PH3,5-diF—OCF$_2$CF=CF$_2$ | 4 |
| C5-CY—CY—PH3,5-diF—OCF$_2$CF=CF$_2$ | 7 |
| C3-CY—PH—PH3,5-diF—OCF$_2$CF=CF$_2$ | 15 |
| C3-CY—PH3F—COO—PH3,5-diF—OCF$_2$CF=CF$_2$ | 5 |
| C3-CY—PH3,5-diF—CF$_2$O—PH3,5-diF—OCF$_2$CF=CF$_2$ | 15 |

Example 9

A liquid crystal composition was prepared as the following blend.

| [blend] | parts by mass |
| --- | --- |
| C3-CY—PH—OCF$_2$CF=CF$_2$ | 18 |
| C3-CY—PH3F—OCF$_2$CF=CF$_2$ | 17 |
| C2-CY—CY—PH3F—OCF$_2$CF=CF$_2$ | 6 |
| C3-CY—CY—PH3F—OCF$_2$CF=CF$_2$ | 6 |
| C3-CY—CY—PH3,5-diF—OCF$_2$CF=CF$_2$ | 8 |
| C3-CY—PH—PH3,5-diF—OCF$_2$CF=CF$_2$ | 15 |
| C3-CY—PH3F—COO—PH3,5-diF—OCF$_2$CF=CF$_2$ | 10 |
| CH$_2$=CH—CY—CY—PH3,5-diF—OCF$_2$CF=CF$_2$ | 10 |
| C3-CY—PH3,5-diF—CF$_2$O-PH3,5-diF—OCF$_2$CF=CF$_2$ | 10 |

Example 10

A liquid crystal composition was prepared as the following blend.

| [blend] | parts by mass |
| --- | --- |
| C3-CY—PH—OCF$_2$CF=CF$_2$ | 13 |
| C3-CY—PH3F—OCF$_2$CF=CF$_2$ | 12 |
| C2-CY—CY—PH3F—OCF$_2$CF=CF$_2$ | 12 |
| C3-CY—CY—PH3,5-diF—OCF$_2$CF=CF$_2$ | 10 |
| C3-CY—PH—PH3,5-diF—OCF$_2$CF=CF$_2$ | 10 |
| C3-CY—PH3F—COO—PH3,5-diF—OCF$_2$CF=CF$_2$ | 10 |
| CH$_2$=CH—CY—CY—PH3,5-diF—OCF$_2$CF=CF$_2$ | 11 |
| C3-CY—PH3,5-diF—COO—PH3,5-diF—OCF$_2$CF=CF$_2$ | 10 |
| CH$_2$=CH—CY—PH—OCF$_2$CF=CF$_2$ | 12 |

Example 11

A liquid crystal composition was prepared as the following blend.

| [blend] | parts by mass |
|---|---|
| C3-CY—PH—OCF$_2$CF=CF$_2$ | 31 |
| C3-CY—PH3F—OCF$_2$CF=CF$_2$ | 5 |
| C3-CY—CY—PH3F—OCF$_2$CF=CF$_2$ | 16 |
| C3-CY—PH—PH3,5-diF—OCF$_2$CF=CF$_2$ | 6 |
| CH$_2$=CH—CY—CY—PH3,5-diF—OCF$_2$CF=CF$_2$ | 18 |
| C3-CY—PH3F—COO—PH3,5-diF—OCF$_2$CF=CF$_2$ | 10 |
| C3-CY—PH3,5-diF—COO—PH3,5-diF—OCF$_2$CF=CF$_2$ | 5 |
| C3-PH—PH3,5-diF—CF$_2$O—PH3,5-diF—OCF$_2$CF=CF$_2$ | 9 |

Example 12

A liquid crystal composition was prepared as the following blend.

| [blend] | parts by mass |
|---|---|
| C3-CY—PH—OCF$_2$CF=CF$_2$ | 30 |
| C3-CY—PH3F—OCF$_2$CF=CF$_2$ | 6 |
| C3-CY—CY—PH3F—OCF$_2$CF=CF$_2$ | 18 |
| C3-PH—PH3F—PH3,5-diF—OCF$_2$CF=CF$_2$ | 5 |
| CH$_2$=CH—CY—CY—PH3,5-diF—OCF$_2$CF=CF$_2$ | 17 |
| C3-CY—PH3F—COO—PH3,5-diF—OCF$_2$CF=CF$_2$ | 13 |
| C3-CY—PH3,5-diF—COO—PH3,5-diF—OCF$_2$CF=CF$_2$ | 3 |
| C3-PH—PH3,5-diF—CF$_2$O—PH3,5-diF—OCF$_2$CF=CF$_2$ | 8 |

Comparative Example 3

A liquid crystal composition was prepared as the following blend.

| [blend] | parts by mass |
|---|---|
| C2-CY—CY—PH3,4-diF | 8 |
| C3-CY—CY—PH3,4-diF | 12 |
| C4-CY—CY—PH3,4-diF | 10 |
| C5-CY—CY—PH3,4-diF | 8 |
| C3-CY—PH—PH3,4-diF | 7 |
| C4-CY—PH—PH3,4-diF | 5 |
| C5-CY—PH—PH3,4-diF | 10 |
| C2-CY—CY—PH3,5-diF—OCF$_2$H | 8 |
| C2-CY-Dio-PH3,4,5-triF | 10 |
| C2-CY—PH—PH3,4,5-triF | 9 |
| C3-CY—PH—PH3,4,5-triF | 6 |
| C2-PH—C≡C—PH3,4-diF | 2 |
| C3-CY—PH—OCH$_3$ | 5 |

The characteristic values of liquid crystal compositions obtained in Examples 8 to 12 and Comparative Example 3 are shown in [Table 3] below.

TABLE 3

|  | Examples | | | | | Comparative Example |
|---|---|---|---|---|---|---|
|  | 8 | 9 | 10 | 11 | 12 | 3 |
| NI Point | 73.5 | 71.3 | 70.2 | 70.6 | 72.8 | 78.0 |
| γ$_1$ | 101 | 96 | 90 | 91 | 89 | 169 |
| Δn | 0.0941 | 0.0960 | 0.0942 | 0.0971 | 0.1008 | 0.1062 |
| Δe | 6.7 | 6.6 | 6.5 | 6.9 | 7.0 | 6.6 |
| Low-Temperature Storage Stability | −30 | −30 | −30 | −20 | −30 | −10 |

NI Point: Nematic-isotropic phase transfer temperature, unit: °C.

γ$_1$: Rotational viscosity coefficient (20° C.), unit: mPa· s

Δn: Refractive index anisotropy (25° C., 589 nm)

Δe: Dielectric anisotropy (25° C., 1 kHz)

Low-Temperature Storage Stability: The lowest temperature at which no change was observed in a screw tube for two weeks. Unit: °C.

As clearly shown in Examples above, the liquid crystal composition of the present invention has both a high dielectric anisotropy (Δ∈) and a low rotational viscosity (γ$_1$), and further is excellent in low-temperature characteristics.

Composition Examples

Hereafter are shown other preferable examples of compositions as the liquid crystal composition of the present invention.

TABLE 4

| liquid crystal compound | parts by mass |
|---|---|
| CH$_2$=CH—CY—CY—C5 | 15 |
| C3-CY—CY—PH—C2 | 10 |

TABLE 4-continued

| liquid crystal compound | parts by mass |
|---|---|
| C2-CY—CY—PH3,5-diF—OCF$_2$H | 12 |
| C2-CY—CY—PH3,5-diF—OCF$_3$ | 8 |
| CH$_2$=CH—CY—CY—PH3,4-diF | 13 |
| C2-CY—PH3F—PH3,4,5-triF | 4 |
| C2-CY—CY—PH3,4-diF | 5 |
| C3-CY—CY—PH3,4,5-triF | 6 |
| C3-CY—CY—PH—OCF$_3$ | 3 |
| C3-CY—PH—PH3,4,5-triF | 8 |
| CH$_2$=CH—CY—CY—PH—C1 | 10 |
| C3-CY—PH—OC2 | 6 |
| | 100 |

TABLE 5

| liquid crystal compound | parts by mass |
|---|---|
| C3-CY—PH—OC2 | 4 |
| C3-CE-CY—C3 | 4 |
| C3-CY—CY—C5 | 11 |
| C3-CY—PH3,5-diF—OCF$_3$ | 10 |
| C2-CY—PH3F—OCF$_3$ | 5 |
| C2-CY—CY—PH3,5-diF—OCF$_2$H | 8 |
| C2-CY—CY—PH3,4-diF | 13 |
| C3-CY—CY—PH3,4-diF | 12 |
| C5-CY—PH—PH3,4-diF | 7 |
| C3-CY—PH3F—PH3,4,5-triF | 5 |
| C2-CY—CY—COO—PH3,4-diF | 6 |
| C3-CY—PH3F—COO—PH—OCF$_3$ | 3 |
| C5-CY—CY—CH$_2$CH$_2$—PH2,3-diF—OCF$_3$ | 3 |
| C3-CY—CY—COO—PH3,5-diF—OCF$_3$ | 5 |
| C3-PH—PH—C≡C—PH2,6-diF—C3 | 4 |
| | 100 |

TABLE 6

| liquid crystal compound | parts by mass |
|---|---|
| CH$_2$=CH—CY—CY—C5 | 20 |
| C7-CY—PH—F | 5 |
| C5-CY—PH—Cl | 5 |
| C2-CY—CY—PH3,5-diF—OCF$_2$H | 8 |
| C2-CY—CY—PH3,4-diF | 11 |
| CH$_2$=CH—CY—CY—PH3,4-diF | 13 |
| C3-CY-Dio-PH3,4-diF | 15 |
| C4-CY—PH—PH3,4-diF | 8 |
| C3-PH—PH3,5-diF—CF$_2$O—PH3,5-diF—OCF$_3$ | 5 |
| C2-CY—PH3F—COO—PH3,5-diF—OCF$_2$H | 6 |
| C3-CY—CY—PH3,5-diF—OCF$_2$CH=CH$_2$ | 4 |
| | 100 |

TABLE 7

| liquid crystal compound | parts by mass |
|---|---|
| CH$_2$=CH—CY—CY—C5 | 20 |
| C3-CY—PH—OC1 | 10 |
| C3-CY—CY—C3 | 8 |
| C2-CY—CY—PH3,5-diF—OCF$_2$H | 10 |
| CH$_2$=CH—CY—CY—PH3,4-diF | 12 |
| C3-CY—CY—PH3,4,5-triF | 12 |
| C3-CY—PH3F—PH3,4,5-triF | 7 |

TABLE 7-continued

| liquid crystal compound | parts by mass |
|---|---|
| C3-CY—CY—COO—PH3,5-diF—OCF$_3$ | 8 |
| C3-CY—CY—COO—PH3,4-diF | 6 |
| C3-CY—PH3F—COO—PH—OCF$_3$ | 7 |
| | 100 |

TABLE 8

| liquid crystal compound | parts by mass |
|---|---|
| C3-CY—PH—OC2 | 5 |
| CH$_2$=CH—CY—PH—C3 | 18 |
| CH$_2$=CH—CY—CY—PH—C1 | 8 |
| C3-CY-Pyd-CY—C4 | 8 |
| C3-CY—CY—PH—OCF$_3$ | 7 |
| C3-CY—CY—PH3,4-diF | 15 |
| C2-CY—CY—PH3,5-diF—OCF$_2$H | 12 |
| C2-CY—CY—COO—PH3,4-diF | 5 |
| C3-CY—PH3,5-diF—COO—PH3,5-diF—OCF$_3$ | 7 |
| C3-CY—CY—CF$_2$O—PH3,4,5-triF | 9 |
| C3-CY—CY—PH—C2 | 6 |
| | 100 |

TABLE 9

| liquid crystal compound | parts by mass |
|---|---|
| CH$_2$=CH—CY—PH3F—OCF$_2$CF=CF$_2$ | 6 |
| CH$_2$=CH—CY—CY—C5 | 10 |
| C3-CY—CY—C5 | 5 |
| C3-CY—PH—OCF$_2$CF=CF$_2$ | 10 |
| CH$_2$=CH—CY—CY—PH—C1 | 9 |
| C2-CY—CY—OCF$_2$CF=CF$_2$ | 14 |
| C3-CY—PH3F—OCF$_2$CF=CF$_2$ | 9 |
| C3-CY—CY—PH3,5-diF—OCF$_2$CF=CF$_2$ | 11 |
| CH$_2$=CH—CY—CY—PH3,5-diF—OCF$_2$CF=CF$_2$ | 5 |
| C3-CY—PH—PH3,5-diF—OCF$_2$CF=CF$_2$ | 16 |
| C3-CY—CY—PH3F—PH3,5-diF—OCF$_2$CF=CF$_2$ | 5 |
| | 100 |

TABLE 10

| liquid crystal compound | parts by mass |
|---|---|
| C3-CY—CY—C5 | 16 |
| C3-CY—PH3F—OCF$_2$CF=CF$_2$ | 15 |
| C3-CY—CY—PH3,5-diF—OCH$_3$ | 4 |
| C3-CY—PH—C≡C—PH3F—OCF$_2$CF=CF$_2$ | 6 |
| C3-CY—CY—PH3,5-diF—OCF$_2$CF=CF$_2$ | 8 |
| CH2=CH—CY—CY—PH3F—OCF$_2$CF=CF$_2$ | 10 |
| C3-CY—CY—PH3,5-diF—OCF$_2$CF=CF$_2$ | 15 |
| C3-CY—CY—COO—PH3,4-diF | 10 |
| C2-CY—PH3F—COO—PH3,4-diF | 5 |
| C3-CY—PH3F—COO—PH—OCF$_3$ | 5 |
| C2-CY—PH3F—PH3F—OCF=CFCF$_3$ | 6 |
| | 100 |

TABLE 11

| liquid crystal compound | parts by mass |
|---|---|
| C3-CY—PH—OC2 | 8 |
| C3-CY—CY—C5 | 5 |
| CH$_2$=CH—CY—CY—C5 | 18 |
| CH$_2$=CH—CY—CY—PH3F—OCF$_2$CF=CF$_2$ | 12 |
| C3-CY—CY—PH3,4,5-diF | 10 |
| C3-CY—CY—PH3,4-diF | 12 |
| C2-CY—PH3F—PH3,4,5-triF | 6 |
| C3-PH—PH3F—PH3,4,5-triF | 6 |
| C3-CY—PH3,5-diF—CF$_2$O—PH3,5-diF—OCF$_2$CF=CF$_2$ | 12 |
| C3-CY—PH3F—COO—PH3,5-diF—OCF$_2$CF=CF$_2$ | 6 |
| C2-CY—PH3,5-diF—COO—PH3,5-diF—OCF$_2$CF=CF$_2$ | 5 |
| | 100 |

TABLE 12

| liquid crystal compound | parts by mass |
|---|---|
| C3-PH—PH3F—OCF$_2$CF=CF$_2$ | 8 |
| C2-CY—PH—OCF$_2$CF=CF$_2$ | 13 |
| C3-CY—PH3F—OCF$_2$CF=CF$_2$ | 5 |
| C7-CY—PH—F | 12 |
| CH$_2$=CH—CY—CY—PH3,4-diF | 18 |
| C3-CY—CY—PH3,4-diF | 9 |
| C2-CY—PH3F—PH3,4,5-triF | 11 |
| CH$_2$=CH—CY—CY—PH3,5-diF—OCF$_2$CF=CF$_2$ | 12 |
| C5-CY—CY—PH3,5-diF—OCF$_2$CF=CF$_2$ | 12 |
| | 100 |

TABLE 13

| liquid crystal compound | parts by mass |
|---|---|
| C3-CY—CY—CF$_3$ | 5 |
| C3-CY—CY—C5 | 7 |
| C3-CY—PH3F—CN | 6 |
| C1-CH=CH—CY—PH—CN | 10 |
| C2-CY—CY—PH3,4-diF | 12 |
| C2-CY—CY—PH3,5-diF—OCF$_2$H | 11 |
| C3-CY—CY—PH3,4-diF | 18 |
| C3-CY—CY—PH3,4,5-triF | 9 |
| C3-CY—PH3F—COO—PH3,5-diF—OCF$_3$ | 5 |
| C3-PH—PH3,5-diF—CF$_2$O—PH3,5-diF—OCF$_2$H | 4 |
| C3-CY—CY—COO—PN—CN | 5 |
| C5-CY—CY—PH3F—OCF$_3$ | 8 |
| | 100 |

TABLE 14

| liquid crystal compound | parts by mass |
|---|---|
| C3-CY—PH—CN | 8 |
| CH$_2$=CH—CY—CY—C5 | 22 |
| CH$_2$=CH—CY—CY—PH3,5-diF—OCF$_2$CF=CF$_2$ | 12 |
| C2-CY—CY—PH3F—OCF$_2$CF=CF$_2$ | 12 |
| C3-CY—CY—PH3,4-diF | 14 |
| C3-CY—CY—PH3,5-diF—OCF$_2$H | 6 |
| C3-CY—PH3F—PH3,4,5-triF | 6 |
| C3-PH—PH3,5-diF—CF$_2$O—PH3,5-diF—OCF$_2$CF=CF$_2$ | 8 |
| C3-CY—PH3F—COO—PH3,5-diF—OCF$_2$CF=CF$_2$ | 5 |
| C4-CY—PH3F—COO—PH—CN | 7 |
| | 100 |

TABLE 15

| liquid crystal compound | parts by mass |
|---|---|
| C2-PH—COO—PH3F—CN | 8 |
| C3-CY—PH3F—OCF$_2$CF=CF$_2$ | 15 |
| CH$_2$=CH—CY—CY—C5 | 6 |
| C3-CY—PH3,5-diF—CN | 5 |
| C2-CY—CY—PH3,4-diF | 10 |
| C3-CY—CY—PH3F—OCF$_2$CF=CF$_2$ | 13 |
| C3-CY—CY—PH3,5-diF—OCF$_2$CF=CF$_2$ | 9 |
| CH$_2$=CH—CY—CY—PH3,5-diF—OCF$_2$CF=CF$_2$ | 9 |
| CH$_2$=CH—CY—CY—PH—C1 | 12 |
| C3-CY—CY—CY—PH—C2 | 8 |
| C3-CY—CY—COO—PH—CY—C3 | 5 |
| | 100 |

INDUSTRIAL APPLICABILITY

The liquid crystal composition of the present invention has a high dielectric anisotropy ($\Delta\varepsilon$) and a low rotational viscosity ($\gamma_1$) and thus is suitably used as a liquid crystal composition for IPS liquid crystal displays or low voltage-driven TN liquid crystal displays.

The invention claimed is:

1. A liquid crystal composition comprising:
   at least 15% by mass of a compound having a terminal structure represented by general formula (I) below:

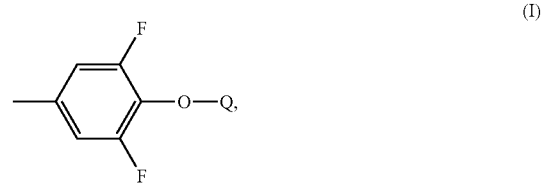

(I)

wherein —O-Q represents is represented by partial structural formula (II) below:

$$-O-CF_2-CF=CF_2 \quad (II);$$

at least one compound represented by any of general formulae (III-1) to (III3) below (Component A), with the proviso of excluding components included in the compounds having a terminal structure represented by general formula (I):

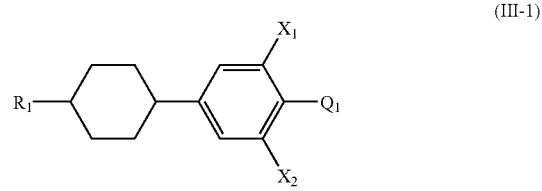

(III-1)

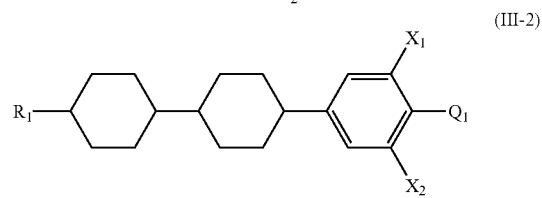

(III-2)

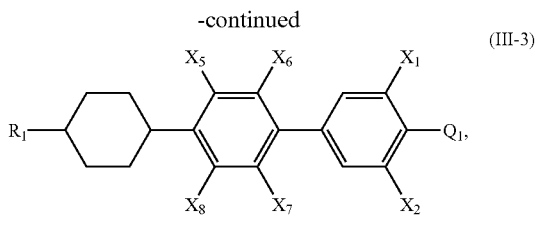

(III-3)

wherein:
- $R_1$ represents $R_0$, $R_0O$, $R_0OCO$, or $R_0COO$;
- $R_0$ represents an alkyl group, containing one or more unsaturated bonds, one or more —$CH_2$— groups may be replaced by —O—, —CO—, or —COO—, and part or all of the hydrogen atoms may be replaced by a halogen atom or cyano group;
- $X_1$ and $X_2$ each independently represent a hydrogen or fluorine atom;
- $Q_1$ represents a halogen atom, haloalkyl group, haloalkoxy group, haloalkenyl group, or haloalkenyloxy group; and
- $X_5$ to $X_8$ each independently represent a hydrogen or fluorine atom; and at least one compound represented by any of general formulae (IV-1) to (IV-3) below (designated as Component B), with the proviso of excluding components included in the compounds having a terminal structure represented by general formula (I):

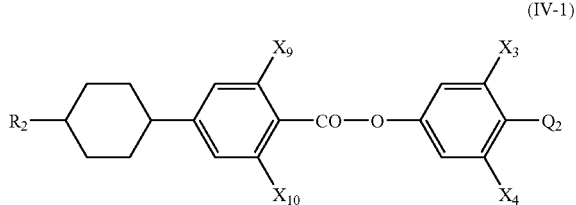

(IV-1)

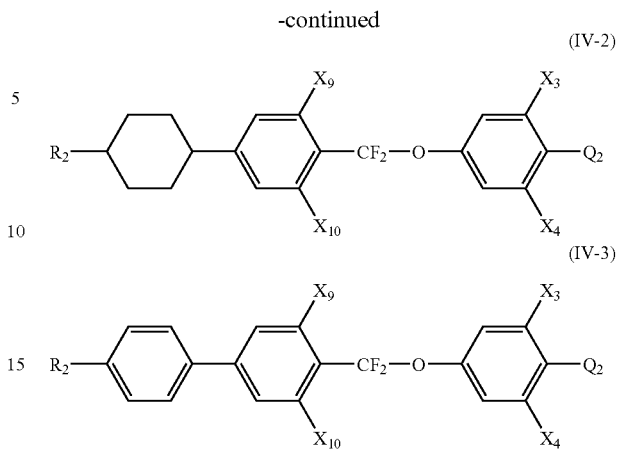

(IV-2)

(IV-3)

wherein:
- $R_2$ represents $R_0$, $R_0O$, $R_0OCO$, or $R_0COO$;
- $R_0$ represents an alkyl group, containing one or more unsaturated bonds, one or more —$CH_2$— group may be replaced by —O—, —CO—, or —COO—, and part or all of the hydrogen atoms may be replaced by a halogen atom or cyano group;
- $X_3$ and $X_4$ each independently represent a hydrogen or fluorine atom;
- $Q_2$ represents a halogen atom, haloalkyl group, haloalkoxy group, haloalkenyl group, or haloalkenyloxy group; and
- $X_9$ and $X_{10}$ each independently represent a hydrogen or fluorine atom.

2. The liquid crystal composition according to claim 1, which is for use in IPS liquid crystal displays.

3. The liquid crystal composition according to claim 1, which is for use in low voltage-driven TN liquid crystal displays.

* * * * *